(12) United States Patent
Kismarton et al.

(10) Patent No.: US 7,716,797 B2
(45) Date of Patent: May 18, 2010

(54) COMPOSITE SEAT PAN STRUCTURE FOR A LIGHTWEIGHT AIRCRAFT SEAT ASSEMBLY

(75) Inventors: Max U. Kismarton, Renton, WA (US); James A. Fullerton, Bothell, WA (US)

(73) Assignee: The Boeing Company, Chicago, IL (US)

( * ) Notice: Subject to any disclaimer, the term of this patent is extended or adjusted under 35 U.S.C. 154(b) by 290 days.

(21) Appl. No.: 11/614,979

(22) Filed: Dec. 22, 2006

(65) Prior Publication Data

US 2008/0282523 A1   Nov. 20, 2008

(51) Int. Cl.
*B68G 7/00* (2006.01)
*B64D 11/06* (2006.01)

(52) U.S. Cl. ............... 29/91.1; 29/897.2; 244/122 R; 297/232; 297/451.11; 297/452.18; 297/452.2; 297/452.65

(58) Field of Classification Search .............. 29/91.1, 29/91, 897.2; 297/232, 248, 445.1, 452.1, 297/451.11, 452.18, 452.2, 452.65; 244/122 R
See application file for complete search history.

(56) References Cited

U.S. PATENT DOCUMENTS

| | | | | |
|---|---|---|---|---|
| 4,229,040 A | * | 10/1980 | Howell et al. | 297/440.1 |
| 4,498,649 A | * | 2/1985 | Toll | 244/118.6 |
| 4,526,421 A | * | 7/1985 | Brennan et al. | 297/232 |
| 4,630,864 A | * | 12/1986 | Toll | 297/232 |
| 4,761,036 A | * | 8/1988 | Vogel | 297/452.18 |
| 4,842,257 A | * | 6/1989 | Abu-Isa et al. | 267/133 |
| 4,898,426 A | * | 2/1990 | Schulz et al. | 297/452.65 |
| 4,939,183 A | * | 7/1990 | Abu-Isa et al. | 521/138 |
| 4,946,526 A | * | 8/1990 | Petty-Galis et al. | 156/155 |
| 5,009,827 A | * | 4/1991 | Abu-Isa et al. | 264/156 |
| 5,409,186 A | * | 4/1995 | Chow | 244/122 R |
| 5,439,271 A | * | 8/1995 | Ryan | 297/452.56 |
| 5,485,976 A | * | 1/1996 | Creed et al. | 244/118.6 |
| 5,575,532 A | * | 11/1996 | von Rolbicki et al. | 297/452.2 |
| 5,681,091 A | * | 10/1997 | Larson et al. | 297/452.21 |
| 5,798,438 A | * | 8/1998 | Sawan et al. | 528/483 |
| 5,904,407 A | * | 5/1999 | Larson et al. | 297/452.21 |
| 6,189,975 B1 | * | 2/2001 | Okazaki et al. | 297/452.18 |
| 6,284,014 B1 | * | 9/2001 | Carden | 75/252 |
| 6,375,268 B2 | * | 4/2002 | Okazaki et al. | 297/452.18 |
| 6,648,402 B2 | * | 11/2003 | Scheib et al. | 296/203.02 |
| 6,672,661 B2 | * | 1/2004 | Williamson | 297/232 |
| 6,749,266 B2 | * | 6/2004 | Williamson | 297/452.2 |

(Continued)

OTHER PUBLICATIONS

Boren, et al, U.S. Appl. No. 11/383,867, filed on May 17, 2006.

*Primary Examiner*—Essama Omgba
(74) *Attorney, Agent, or Firm*—Tung & Associates

(57) ABSTRACT

An aircraft passenger seat configured in accordance with an embodiment of the invention utilizes composite materials to achieve significant weight savings relative to conventional seat designs. The seat includes one or more lightweight composite support legs, a lightweight composite seat pan, and a lightweight composite seat back structure. The support legs are coupled to the seat pan, which is in turn coupled to the seat back structure. The support legs utilize composite frame elements that are formed as continuous compression molded composite extrusions. The seat pan includes composite fore and aft cross beams that are also formed as continuous compression molded composite extrusions. The aft cross beam includes a rear flange that serves as a flexible "hinge" for the seat back structure. The seat can leverage producible and relatively inexpensive composite manufacturing techniques such that the seat can be economically produced for use as an economy class seat.

6 Claims, 24 Drawing Sheets

U.S. PATENT DOCUMENTS

| | | | |
|---|---|---|---|
| 6,776,457 B2 * | 8/2004 | Muin et al. | 297/331 |
| 6,896,324 B1 * | 5/2005 | Kull et al. | 297/216.1 |
| 7,083,230 B2 * | 8/2006 | Kull et al. | 297/216.1 |
| 2005/0028899 A1 * | 2/2005 | Igumenov et al. | 148/552 |
| 2008/0088166 A1 * | 4/2008 | Gardiner et al. | 297/344.14 |
| 2008/0150342 A1 * | 6/2008 | Kismarton et al. | 297/452.18 |
| 2008/0290242 A1 * | 11/2008 | Kismarton et al. | 248/503.1 |
| 2009/0084925 A1 * | 4/2009 | Kismarton | 248/503.1 |

* cited by examiner

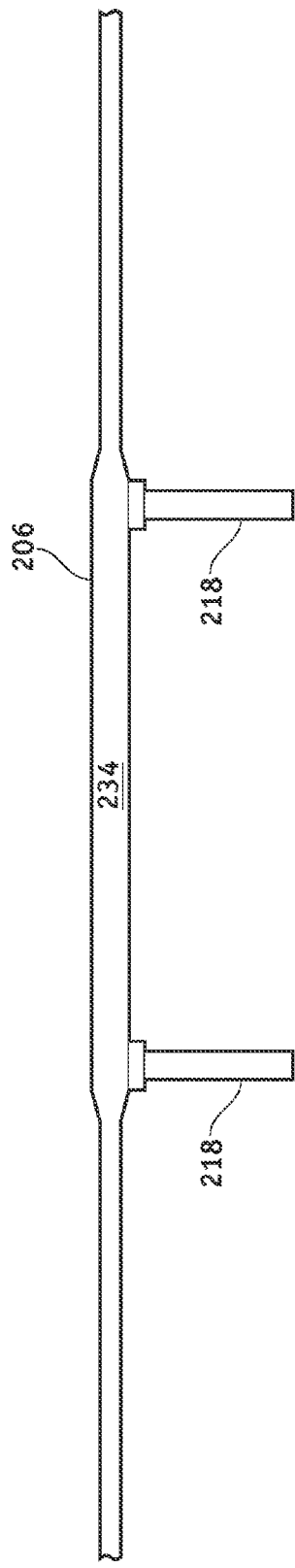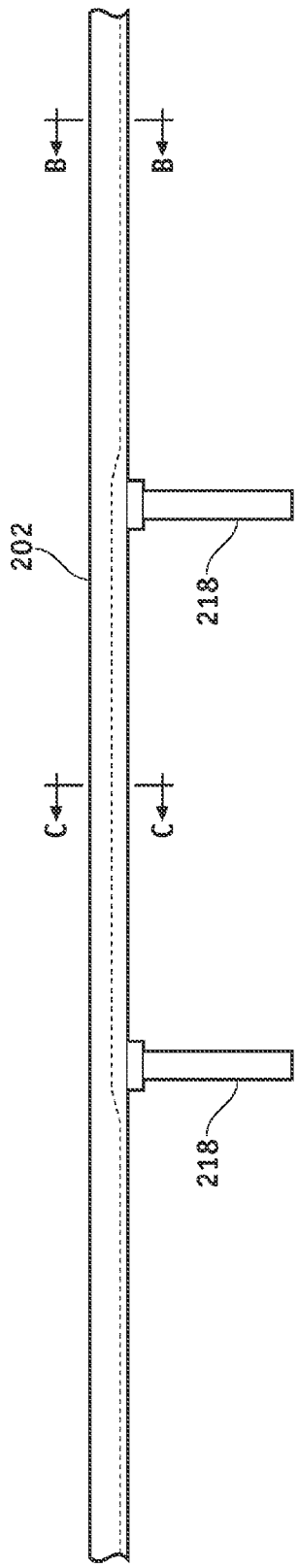

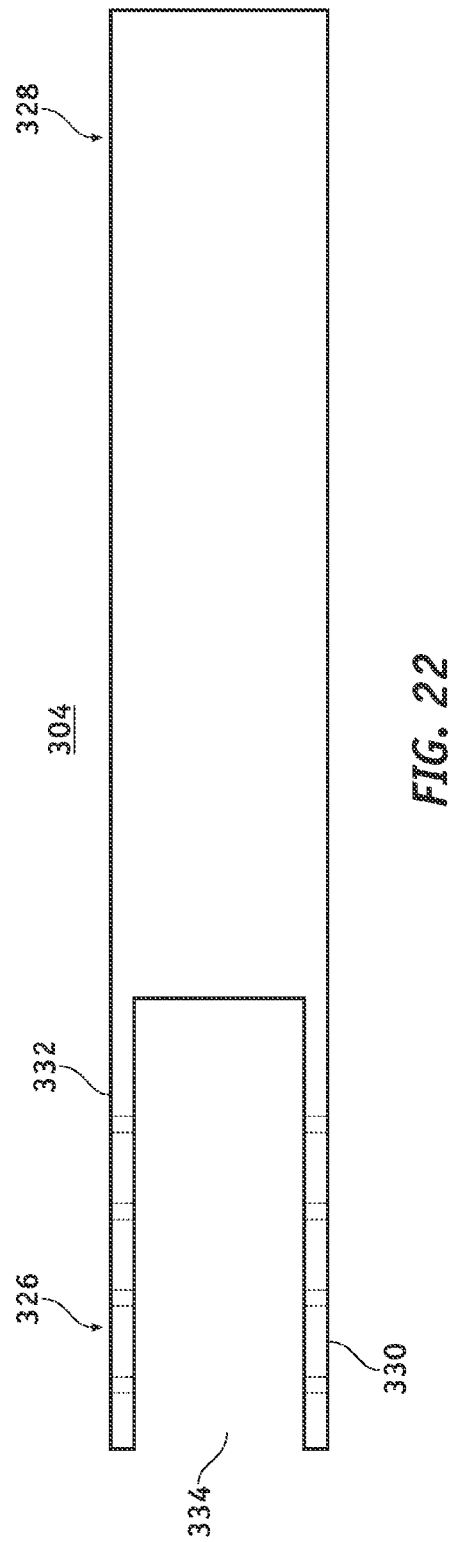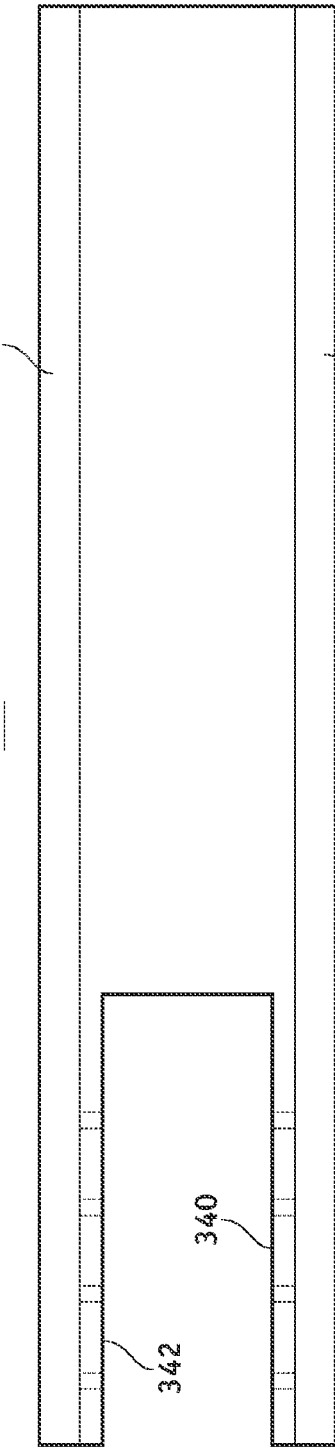

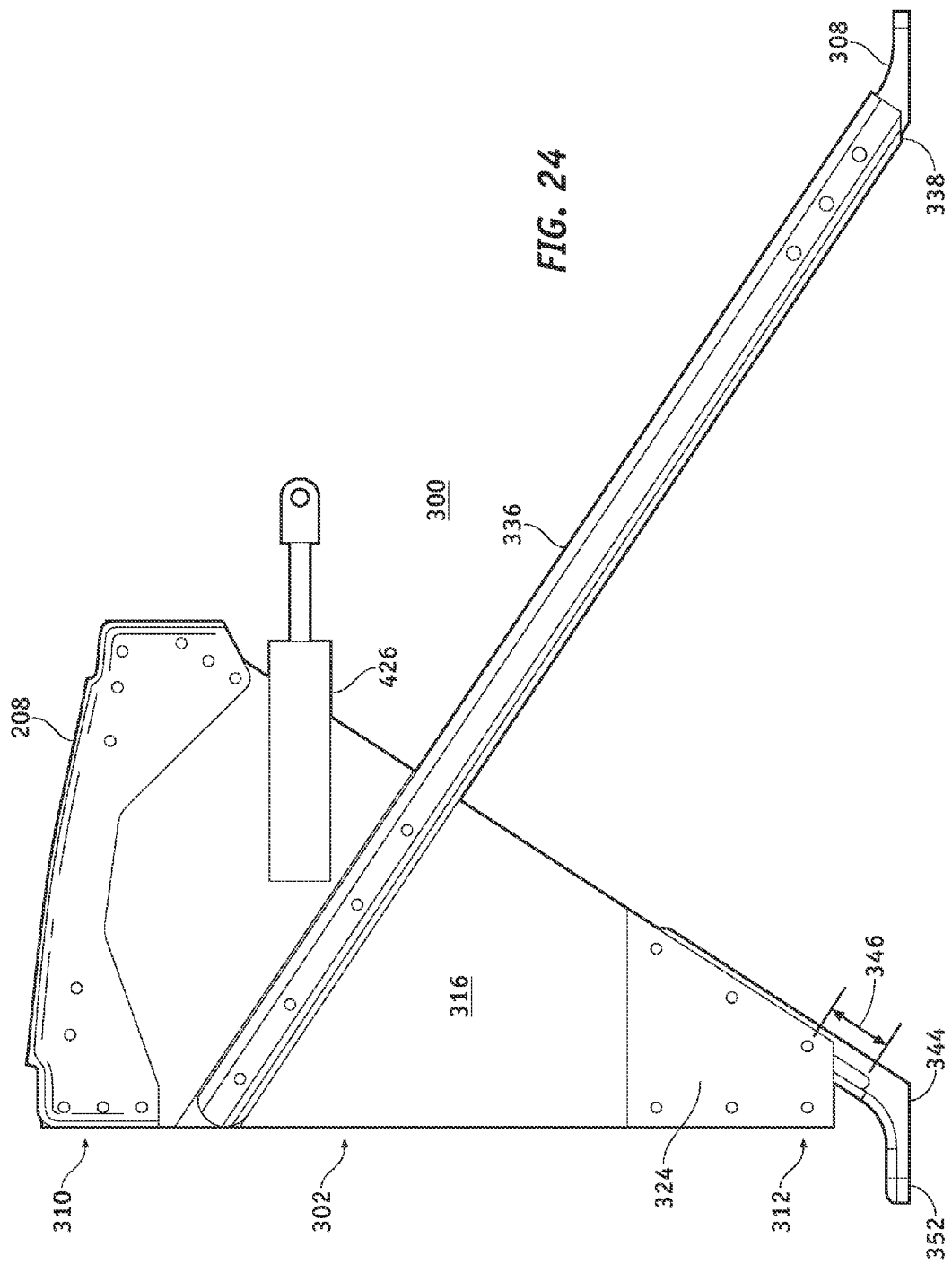

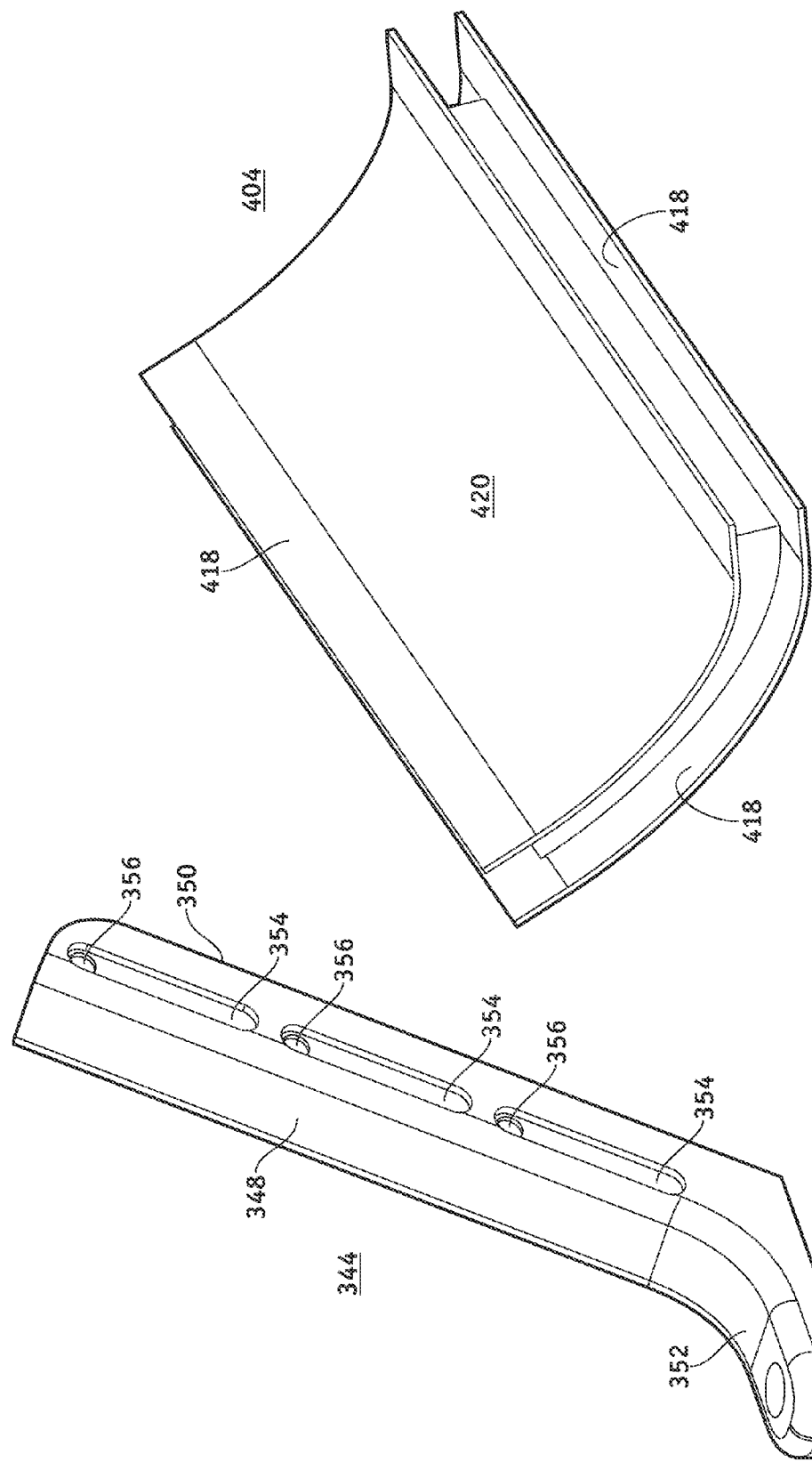

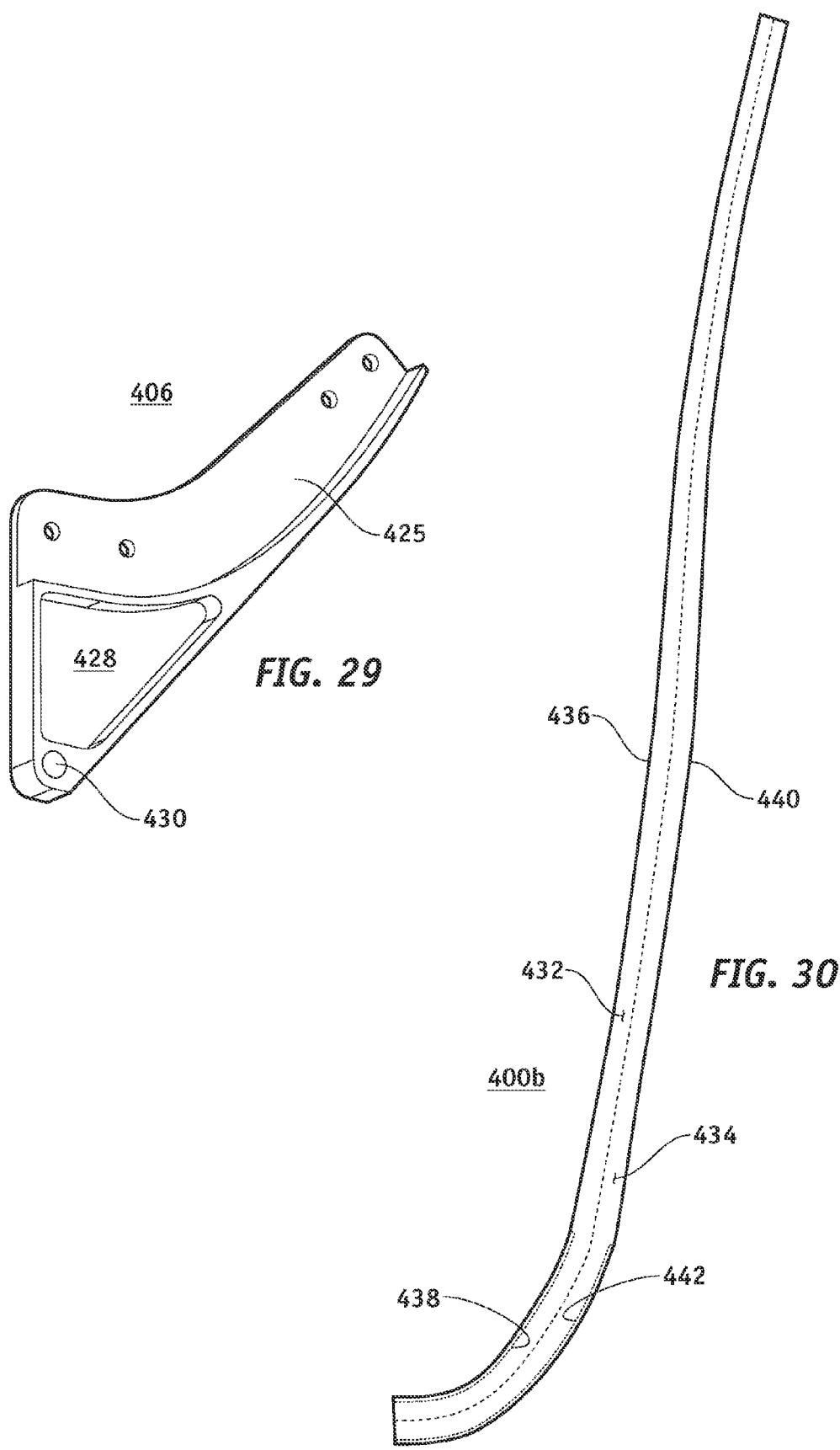

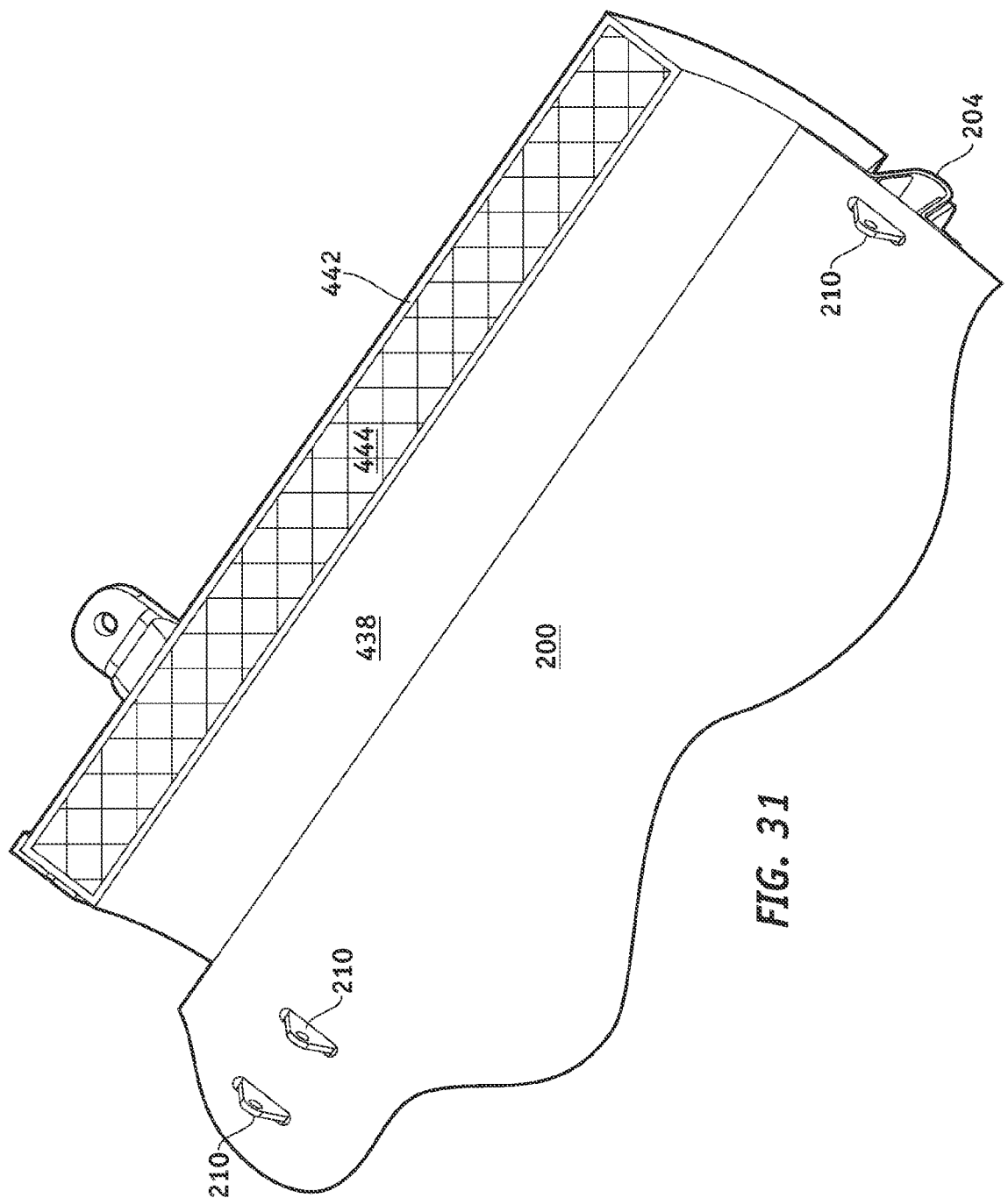

COMPOSITE SEAT PAN STRUCTURE FOR A LIGHTWEIGHT AIRCRAFT SEAT ASSEMBLY

TECHNICAL FIELD

Embodiments of the present invention relate generally to aircraft components. More particularly, embodiments of the present invention relate to composite structures, components, and assemblies for a lightweight aircraft passenger seat.

BACKGROUND

Commercial aircraft utilize different passenger seating configurations and designs. Historically, aircraft passenger seats have been manufactured using heavy and bulky materials that satisfy certain structural design requirements and passenger comfort requirements. In this regard, conventional aircraft passenger seats include a number of relatively heavy metal components. Such components can contribute a significant amount to the overall weight of an aircraft, particularly when the aircraft includes seats for hundreds of passengers. Weight reduction is becoming increasingly important in modern aircraft design. A reduction in the weight of the aircraft structure may allow the aircraft to carry more fuel, thus extending the flight range. A reduction in the weight of the aircraft structure may also allow the aircraft to carry additional passengers and/or cargo, thus increasing the potential profitability of the aircraft.

The amount of legroom and personal space in a commercial aircraft influences the overall comfort of the passenger. The size of the passenger seats and the number of seat rows determines the amount of legroom and personal space for a given aircraft. In practice, the bulky materials and thick padding utilized in conventional aircraft passenger seats consume precious cabin space that could otherwise be used for increased legroom and/or used for additional rows of seats. Unfortunately, such bulky materials are usually necessary for structural support and thick padding is usually necessary to provide sufficient cushioning for the seated passengers.

Accordingly, it is desirable to have a lightweight passenger seat for aircraft applications. In addition, it is desirable to have a passenger seat for aircraft applications having a smaller fore-aft dimension relative to conventional passenger seat designs. Furthermore, other desirable features and characteristics of embodiments of the present invention will become apparent from the subsequent detailed description and the appended claims, taken in conjunction with the accompanying drawings and the foregoing technical field and background.

BRIEF SUMMARY

An aircraft passenger seat configured in accordance with an example embodiment of the invention includes a lightweight composite construction that provides weight savings and size reduction compared to conventional seats. The composite construction enables the passenger seat to meet required structural specifications in a compact and lightweight configuration. In one embodiment, the lightweight aircraft passenger seat utilizes a composite support leg structure having little or no metal parts. In one embodiment, the lightweight aircraft passenger seat utilizes a composite seat pan assembly having little or no metal parts. In one embodiment, the lightweight aircraft passenger seat utilizes a composite seat back structure. The composite seat pan assembly and the composite seat back structure may be coupled together using a composite flange element that serves as a lightweight hinge element for the seat back structure.

The above and other aspects of an embodiment of the invention may be carried out by a composite seat pan for a lightweight aircraft passenger seat. The composite seat pan includes: a composite fore cross beam; a composite aft cross beam; and a composite skin having an upper surface and an opposite lower surface coupled to the composite fore cross beam and to the composite aft cross beam, the composite skin being configured as a structural element of the composite seat pan that resists fore-aft bending of the composite fore cross beam and the composite aft cross beam.

The above and other aspects of an embodiment of the invention may be carried out by a method of manufacturing a composite seat pan for a lightweight aircraft passenger seat. The method involves: forming a fore cross beam from a first composite extrusion using a continuous compression molding process; forming an aft cross beam from a second composite extrusion using the continuous compression molding process; structurally joining the fore cross beam to the aft cross beam with a plurality of spreader bars; and structurally coupling a composite skin to the fore cross beam, the aft cross beam, and the spreader bars.

The above and other aspects of an embodiment of the invention may be carried out by a composite seat pan assembly for a lightweight aircraft passenger seat. The composite seat pan assembly includes: a composite fore cross beam; a composite aft cross beam having a rear flange configured for coupling to a seat back of the lightweight aircraft passenger seat, the rear flange being flexible and resilient to facilitate pivoting of the seat back relative to the composite aft cross beam; and a composite skin having an upper surface and an opposite lower surface coupled to the composite fore cross beam and to the composite aft cross beam.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 10 is a side view of an embodiment of a composite cross beam suitable for use with a composite seat pan;

FIG. 13 is a side view of an embodiment of a composite skin suitable for use with a composite seat pan;

FIG. 22 is a top view of an embodiment of a composite brace suitable for use with a composite support leg;

FIG. 23 is a top view of an alternate embodiment of a composite brace suitable for use with a composite support leg;

FIG. 24 is a side view of another embodiment of a composite support leg, showing floor mounting fittings and a seat back actuator;

FIG. 25 is a perspective view of an embodiment of a fitting suitable for use with the composite support leg shown in FIG. 24;

FIG. 27 is a perspective view of an embodiment of a torque box suitable for use with the composite seat back structure shown in FIG. 26;

FIG. 29 is a perspective view of an embodiment of an actuator rib suitable for use with the composite seat back structure shown in FIG. 26;

FIG. 30 is a side view of an alternate embodiment of a composite seat back structure for a lightweight aircraft passenger seat; and FIG. 31 is a perspective cross sectional view of the composite seat back structure shown in FIG. 30 cut through the major section of the torque box.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

For the sake of brevity, conventional aspects and techniques related to the manufacture of composite materials (including the handling and processing of particular chemicals, compounds, resins, fibers, and substrates) may not be described in detail herein.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Figure 1:
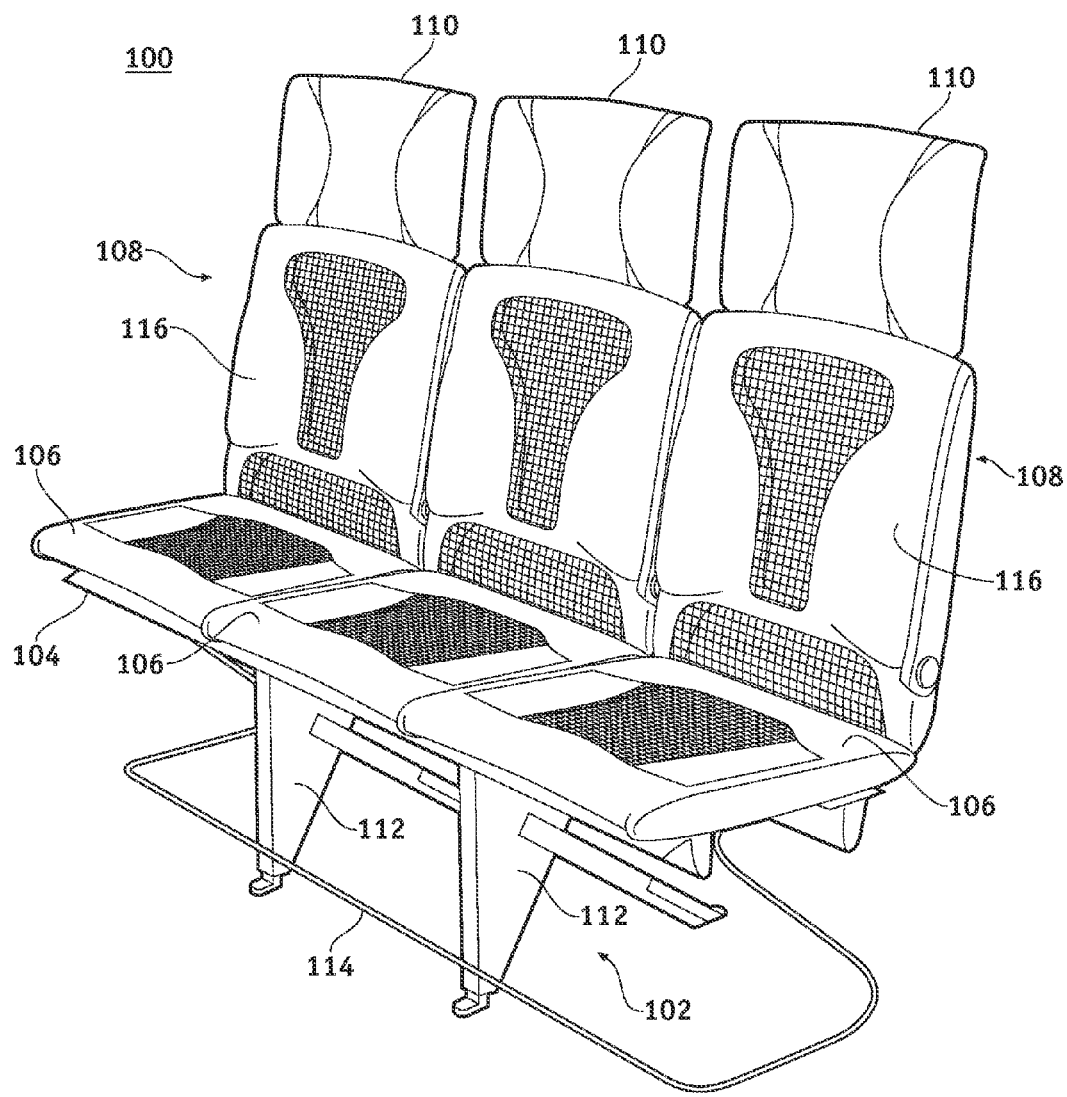
FIG. 1 is a front perspective view of an embodiment of a lightweight aircraft passenger seat.

FIG. 1 is a front perspective view of a lightweight aircraft passenger seat 100 configured in accordance with an embodiment of the invention. Seat 100 is suitable for use as a passenger seat in an aircraft, e.g., as a row in a commercial aircraft. Although seat 100 is depicted as a triple seat assembly, the concepts, techniques, features, and technologies described herein can be extended to any practical seat configuration, such as a double seat, a quad seat, a single seat, or a seat configured to accommodate any number of passengers, limited only by practical size restrictions, structural material properties, and aircraft configuration. The triple seat configuration depicted in the figures is not intended to limit or otherwise restrict the use or scope of the described embodiments in any way. Another embodiment of an aircraft passenger seat having a composite construction is disclosed in U.S. patent application Ser. No. 11/383,867, titled Lightweight Aircraft Passenger Seat with Composite Construction (the entire content of which is incorporated by reference herein).

Seat 100 generally includes a lightweight composite support structure 102, a lightweight composite seat pan 104 sized to accommodate three passengers, three seat cushions 106, three seat back arrangements 108, and three headrests 110. The combination of these main components results in a lightweight and compact (from fore-to-aft) construction relative to conventional aircraft seat assemblies. This particular embodiment, it is estimated, weighs about 18 pounds per passenger place (or 54 pounds per triple assembly as embodied herein). This represents a significant reduction in weight relative to conventional non-composite seat designs. As a comparison, current best-in-class economy seats typically weight more than 24 pounds per passenger place.

Lightweight composite support structure 102 has an upper end (hidden from view in FIG. 1) and a lower end that is suitably configured to accommodate attachment to the floor of the aircraft. The lower end may, for example, be designed for compatibility with seat mounting rails that are integrated into the floor of the aircraft. The upper end of support structure 102 is coupled to the lower side of seat pan 104 using fasteners, an attachment mechanism, a suitable attachment material or composition, or the like. In practice, support structure 102 can be tuned according to the seating capacity of the particular aircraft seat assembly (three passengers for seat 100). In this regard, support structure 102 (and seat 100 in general) is suitably configured to provide structural support for three adult passengers and to satisfy any required structural, static, or dynamic tests, such as, for example, the "16G" dynamic testing mandated by the Federal Aviation Administration.

In the illustrated embodiment, lightweight composite support structure 102 includes two composite support legs 112. Composite support legs 112 may be identical and/or symmetrical to one another, and each composite support leg 112 is individually coupled to the lower side of seat pan 104 as mentioned above. As described in more detail below, each composite support leg 112 has an upper end that is coupled to the lower side of seat pan 104 via at least one spreader bar (not shown in FIG. 1). An example construction for composite support legs 112 is described in more detail below with reference to FIGS. 16-25. Seat 100 may also include a luggage retaining bar 114 coupled to (or located near) support structure 102 and/or seat pan 104.

Composite seat pan 104 has an upper side (upon which seat cushions 106 are located), a lower side coupled to the upper end of lightweight composite support structure 102, a front (fore) section, and a rear (aft) section. In certain embodiments, composite seat pan 104 provides structural support for passenger armrests and/or provides structural mounting locations for passenger seat belts. An exemplary construction for composite seat pan 104 is described in more detail below with reference to FIGS. 2-5.

Seat cushions 106 are positioned on the upper side of composite seat pan 104. Seat 100 may utilize individual and physically distinct seat cushions 106 or a subassembly that includes seat cushions 106 coupled together. For example, seat cushions 106 may be joined together via a suitably configured webbing, seam, or connecting material.

Seat back arrangements 108 are coupled to composite seat pan 104 in a manner that enables them to recline and tilt forward as needed. In this example embodiment, each seat back arrangement 108 is a separate component, which enables independent pivoting relative to composite seat pan 104. Each seat back arrangement 108 may include a seat back structure (hidden from view in FIG. 1) and a seat back cushion 116 coupled to the seat back structure. The seat back structures provide structural support for the respective seat back cushions 116 and provide back support for the passengers. The seat back structures may be coupled to the rear section of composite seat pan 104 in an appropriate manner. For example, an integrated feature of composite seat pan 104 may serve as an attachment architecture (e.g., a flexible "hinge") for the seat back structures. Embodiments of a seat back structure suitable for use with seat 100 are described below with reference to FIGS. 26-31.

Figure 2:
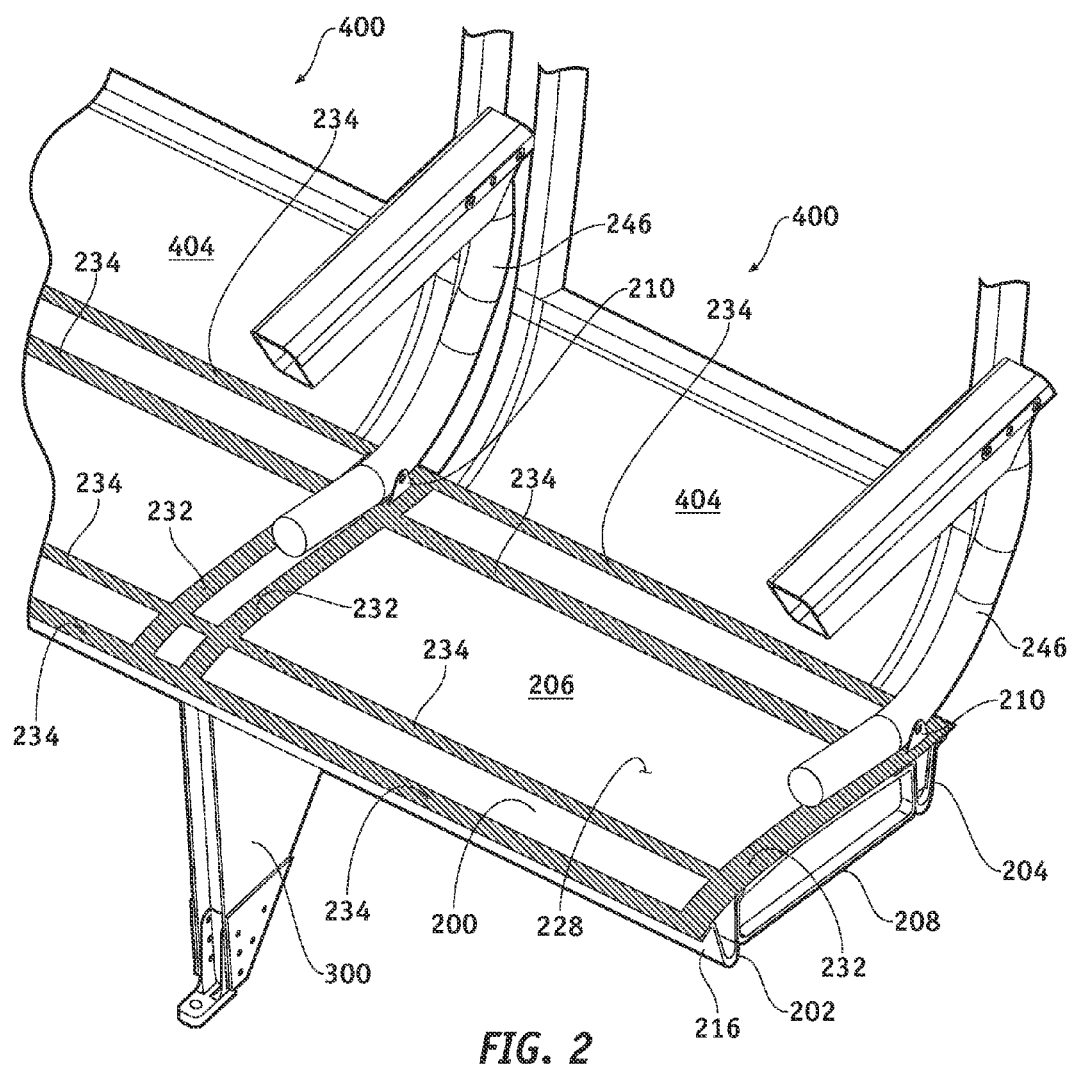
FIG. 2 is a front perspective view of a portion of a lightweight aircraft passenger seat.
Figure 3:
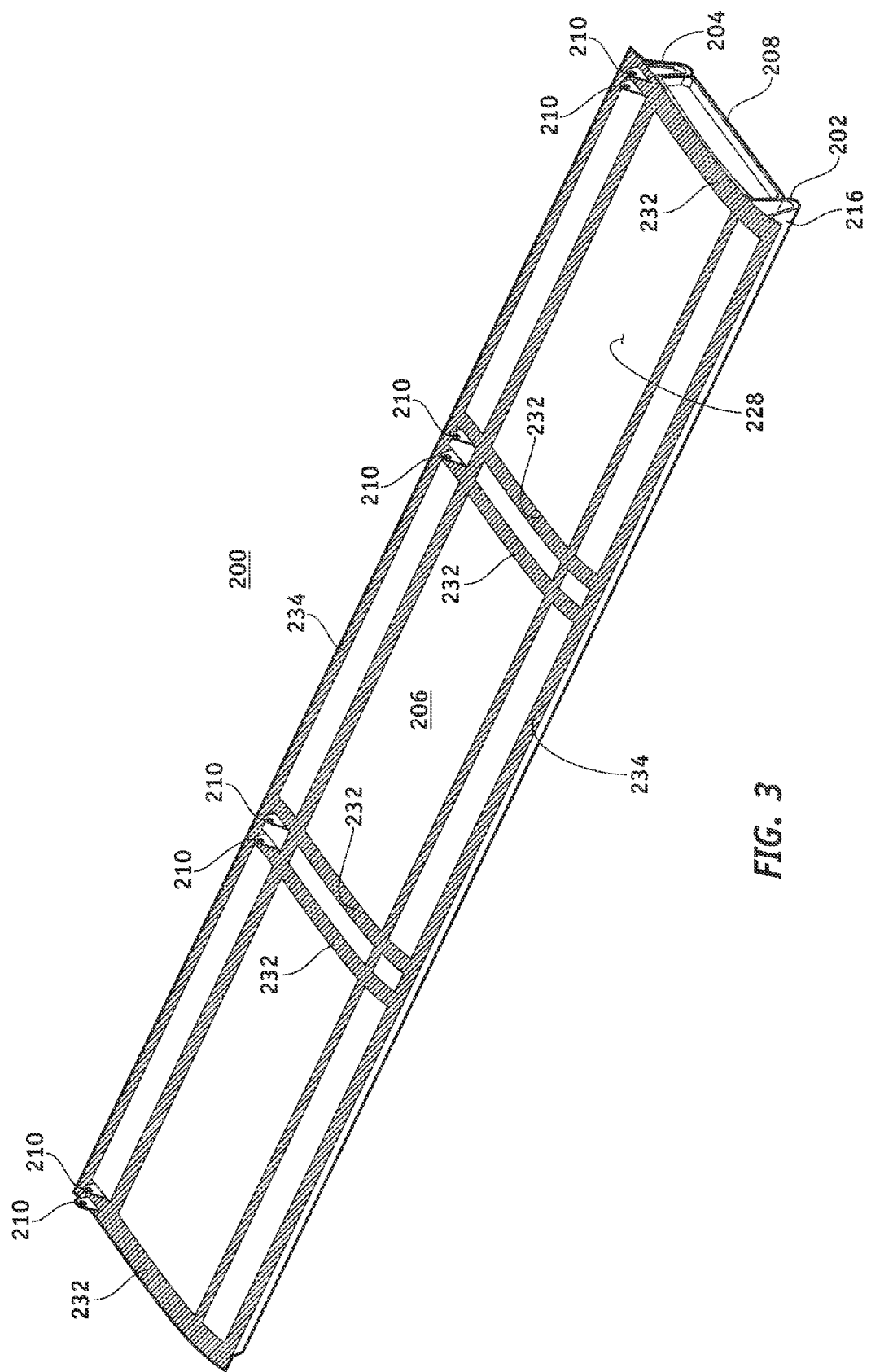
FIG. 3 is a front perspective view of an embodiment of a composite seat pan for a lightweight aircraft passenger seat.

An embodiment of a lightweight aircraft passenger seat as described herein includes several primary structural components: composite support legs; a composite seat pan; and composite seat back structures. FIG. 2 and FIGS. 4-9 illustrate these main structural components (without any seat cushions or seat back cushions) and show how they cooperate to function as the overall support architecture for the seat. FIG. 2 is a front perspective view of a portion of a lightweight aircraft passenger seat, FIG. 3 is a front perspective view of an embodiment of a composite seat pan 200, and FIG. 5 is a bottom perspective view of a portion of the lightweight aircraft passenger seat—these figures generally illustrate the manner in which these primary components are coupled together. FIG. 5 and FIG. 6 show seat pan 200 coupled to composite support legs 300, and coupled to composite seat back structures 400. Each of these main structural components will be described in detail below.

Composite Seat Pan

Figure 4:
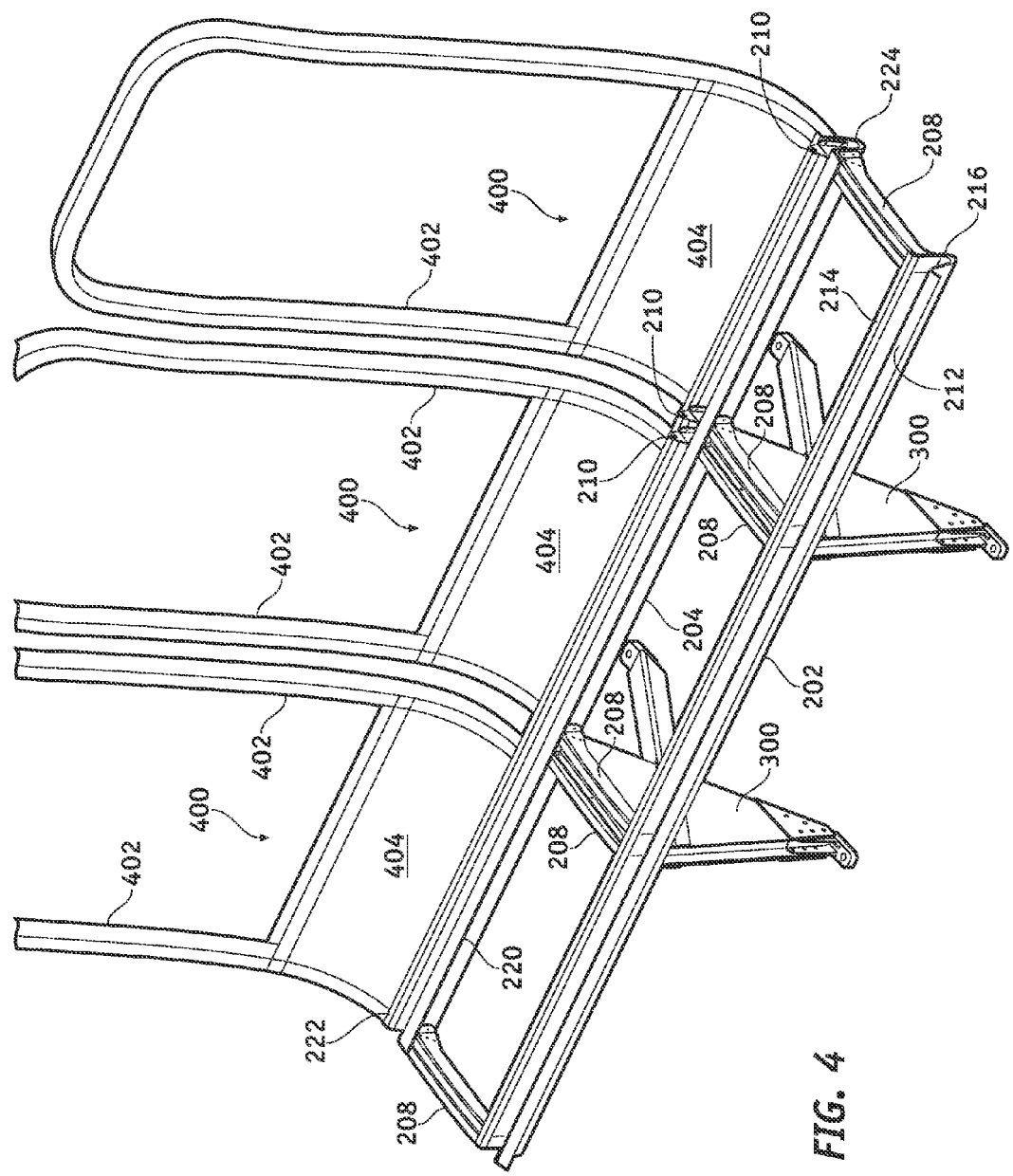
FIG. 4 is a front perspective view of a portion of a lightweight aircraft passenger seat.
Figure 5:
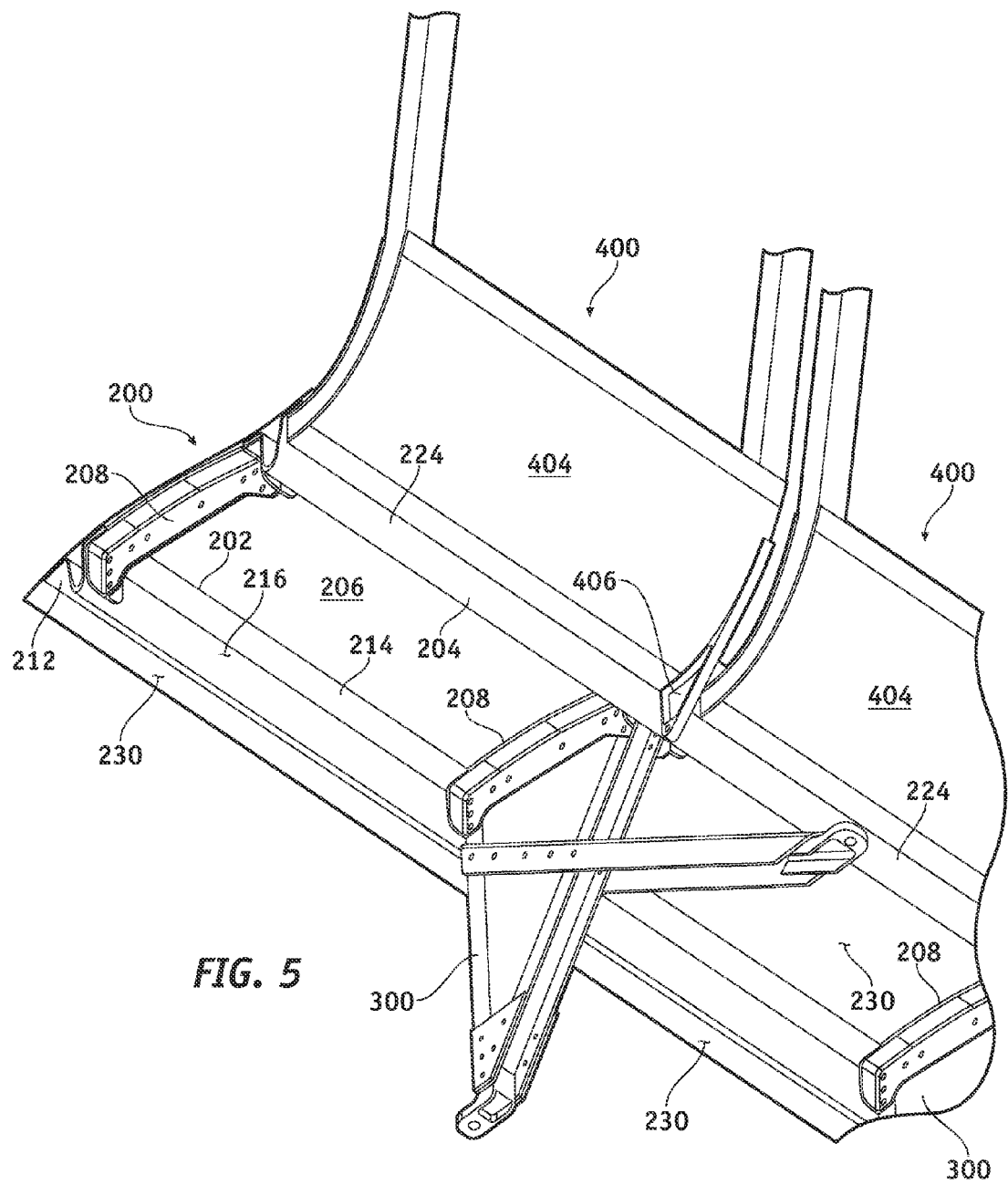
FIG. 5 is a rear perspective view of a portion of a lightweight aircraft passenger seat.
Figure 6:
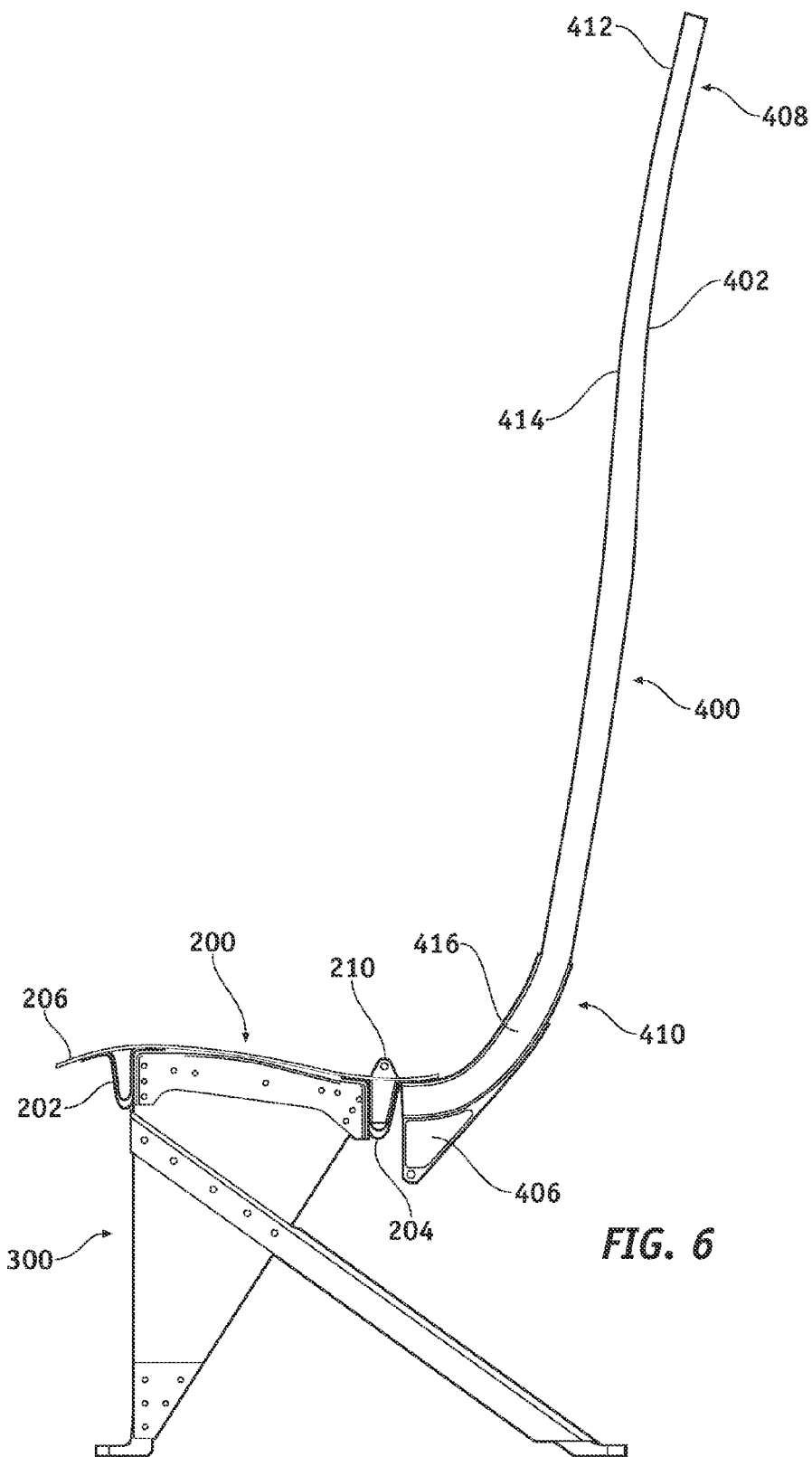
FIG. 6 is a side view of a portion of a lightweight aircraft passenger seat.

Referring to FIGS. 2-5, composite seat pan 200 generally includes a fore cross beam 202, an aft cross beam 204, a skin or membrane 206, and a plurality of spreader bars 208. Seat pan 200 may also include a number of seat belt anchors 210 coupled to aft cross beam 204. FIG. 4, which is a front perspective view of a portion of an aircraft passenger seat, shows the entire fore cross beam 202 and the entire aft cross beam 204 in relation to other structural members of the seat.

Figure 7:
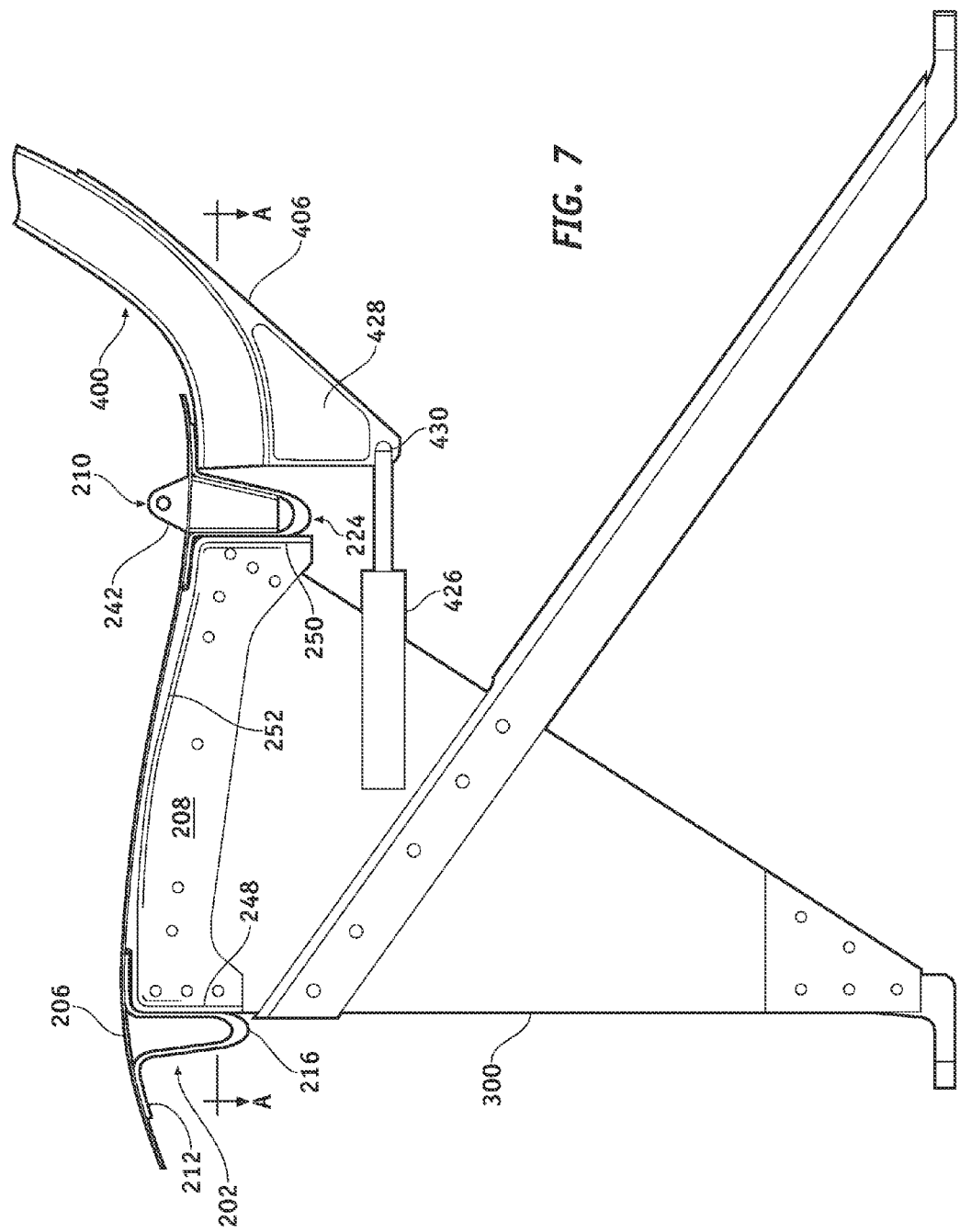
FIG. 7 is a detailed side view of a portion of a lightweight aircraft passenger seat.

Fore cross beam 202 includes a forward flange 212, a rear flange 214, and a generally U-shaped section 216 between forward flange 212 and rear flange 214. Forward flange 212 and rear flange 214 run along the major longitudinal axis of fore cross beam 202. U-shaped section 216, which also runs along the major longitudinal axis of fore cross beam 202, extends in the downward direction relative to the normal orientation of the seat, as depicted in FIG. 7 (which is a detailed side view of a portion of the seat). In this context, the major longitudinal axis of fore cross beam 202 (and of aft cross beam 204) runs along the width of the seat (see FIG. 4). In other words, the major longitudinal axis of fore cross beam 202 corresponds to its longest dimension.

As depicted in FIG. 7, fore cross beam 202 has an asymmetric longitudinal cross section that is suitably configured to provide a directional load-bearing characteristic. In this regard, U-shaped section 216 is designed to provide structural support to primarily accommodate loading in the up-down direction rather than in the fore-aft direction. U-shaped section 216 is relatively stiff and resistant to vertical deflection, and is less stiff and less resistant to horizontal bending (where "vertical" and "horizontal" are relative to the usual seating orientation shown in the figures). This asymmetric configuration allows fore cross beam 202 to be manufactured with less material (to reduce weight) because fore cross beam 202 need not withstand high loading in the fore-aft direction. As described in more detail below, skin 206 is suitably configured as a structural element that cooperates with fore cross beam 202 and aft cross beam 204 to withstand such fore-aft loading. In contrast to the asymmetric cross section of fore cross beam 202, a traditional cross beam formed from round tube stock (e.g., a round metal tube) has a symmetric longitudinal cross section that provides a symmetric load-bearing characteristic.

Figure 11:
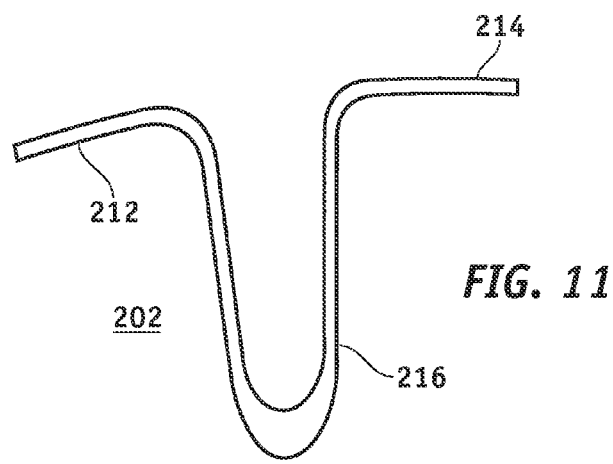
FIG. 11 is a cross sectional view of the cross beam shown in FIG. 10, as viewed from line B-B.
Figure 12:
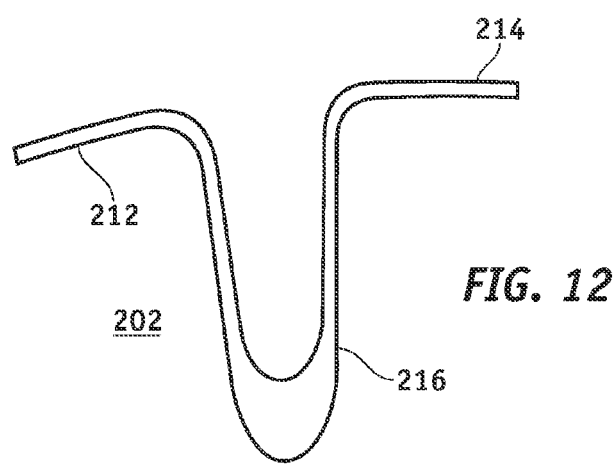
FIG. 12 is a cross sectional view of the cross beam shown in FIG. 10, as viewed from line C-C.

In certain embodiments, fore cross beam 202 has a non-uniform cross section, relative to its major longitudinal axis. In other words, the cross sectional configuration of fore cross beam 202 changes along its length. In this regard, FIG. 10 is a simplified side view of fore cross beam 202 (FIG. 10 may also represent a side view of aft cross beam 204), FIG. 11 is a cross sectional view as viewed from line B-B in FIG. 10, and FIG. 12 is a cross sectional view as viewed from line C-C in FIG. 10. The non-uniform cross section reinforces fore cross beam 202 at one or more mounting locations for the support legs 218 of the seat. For example, fore cross beam 202 may be suitably configured to provide additional stiffness and strength at and between support legs 218. In the illustrated embodiment, U-shaped section 216 of fore cross beam 202 has a non-uniform thickness near its lowermost segment: U-shaped section 216 is thicker in the span of fore cross beam 202 at and between support legs 218 and is thinner outside this span. This non-uniform thickness is shown in dashed lines in FIG. 10. FIG. 11 depicts the relatively thin cross section of fore cross beam 202 and FIG. 12 depicts the relatively thick cross section of fore cross beam 202. In the illustrated embodiment, the thinner U-shaped section 216 is about 0.1 to 0.2 inch thick, while the thicker U-shaped section 216 is about 0.3 to 0.7 inch thick. The gauge of fore cross beam 202 elsewhere remains substantially constant over its longitudinal aspect—approximately 0.05 inch to 0.07 inch thick in certain embodiments. The non-uniform nature of fore cross beam 202 results in weight savings due to precise optimization of strength characteristics accomplished by tailoring the beam thicknesses to the loads imparted locally along the beam.

Fore cross beam 202 may be formed from a lightweight metal such as aluminum or titanium, a high strength molded plastic, or any suitable material or combination of materials. In one embodiment, fore cross beam 202 is formed as a one-piece composite construction. For example, fore cross beam 202 can be realized as an extruded composite beam. In particular, fore cross beam 202 may be a continuous compression molded composite beam that is formed using an appropriate continuous compression molding process. This process results in a producible fore cross beam 202 that might otherwise be too costly to manufacture. Briefly, one such process begins with composite sheets of laminated thermoplastic and fiber material (each sheet may have any number of layers, and each sheet may be about 0.005 inch thick). The process employs heat and pressure to fuse multiple sheets together and to form the sheets into the desired shape. For example, fore cross beam 202 may be manufactured from 10-15 individual sheets of material. The thicker area of U-shaped section 216 may be formed by molding extra layers where needed.

One embodiment of fore cross beam 202 includes a thermoplastic resin and at least one layer of carbon graphite fiber material that has been treated using the continuous compression molding process described above. In a practical deployment, the thermoplastic resin is polyetherketoneketone (PEKK), which satisfies certain flammability, smoke emission, and toxicity requirements (for example, PEKK melts at a very high temperature of approximately 700° F.). Polyetherimide (PEI) is another thermoplastic resin that is suitable for use in the various applications described herein. Of course, other composite materials, resins, and fibers may be used in an embodiment of fore cross beam 202.

In practice, fore cross beam 202 is formed as a composite extrusion from material having directional fibers, where the extrusion includes a specific layup configuration that is optimized to reduce weight while retaining the desired structural characteristics. Generally, this layup is such that at least thirty percent of the fibers in the composite extrusion are oriented within the range of ±30 degrees relative to the major longitudinal axis of fore cross beam 202. For reference, the longitudinal axis corresponds to the zero degree reference direction. In one embodiment, more than fifty percent of the fibers in the composite extrusion are oriented at approximately ±5 degrees relative to the major longitudinal axis of fore cross beam 202, and less than fifty percent of the fibers in the composite extrusion are oriented at approximately ±65 degrees relative to the major longitudinal axis of fore cross beam 202. In one specific embodiment, approximately eighty percent of the fibers in the composite extrusion are oriented at approximately ±5 degrees relative to the major longitudinal axis of fore cross beam 202, and approximately twenty percent of the fibers in the composite extrusion are oriented at approximately ±65 degrees relative to the major longitudinal axis of fore cross beam 202. This specific layup may include, for example, eight plies having fibers oriented at approximately ±5 degrees, and two plies having fibers oriented at approximately ±65 degrees, alternating in a suitable layering scheme. The thicker portion of U-shaped section 216 may include any number of additional plies (oriented at ±5 degrees and/or ±65 degrees) that are compression molded into the extrusion as described above.

Aft cross beam 204 is generally configured as described above for fore cross beam 202 (features, aspects, and elements of aft cross beam 204 that are shared with fore cross beam 202 will not be redundantly described in detail here). In practice, aft cross beam 204 may have a different shape than fore cross beam 202 to accommodate the desired contour of skin 206 and/or to provide different structural characteristics. Aft cross beam 204 includes a forward flange 220, a rear flange 222, and a generally U-shaped section 224 between forward flange 220 and rear flange 222. As with fore cross beam 202, aft cross beam 204 may have a non-uniform cross section, relative to its major longitudinal axis, that provides additional rigidity and strength near the support legs of the aircraft passenger seat. For this embodiment, aft cross beam 204 is also formed as a continuous compression molded composite beam, which preferably has the composition and layup described above for fore cross beam 202.

Figure 8:
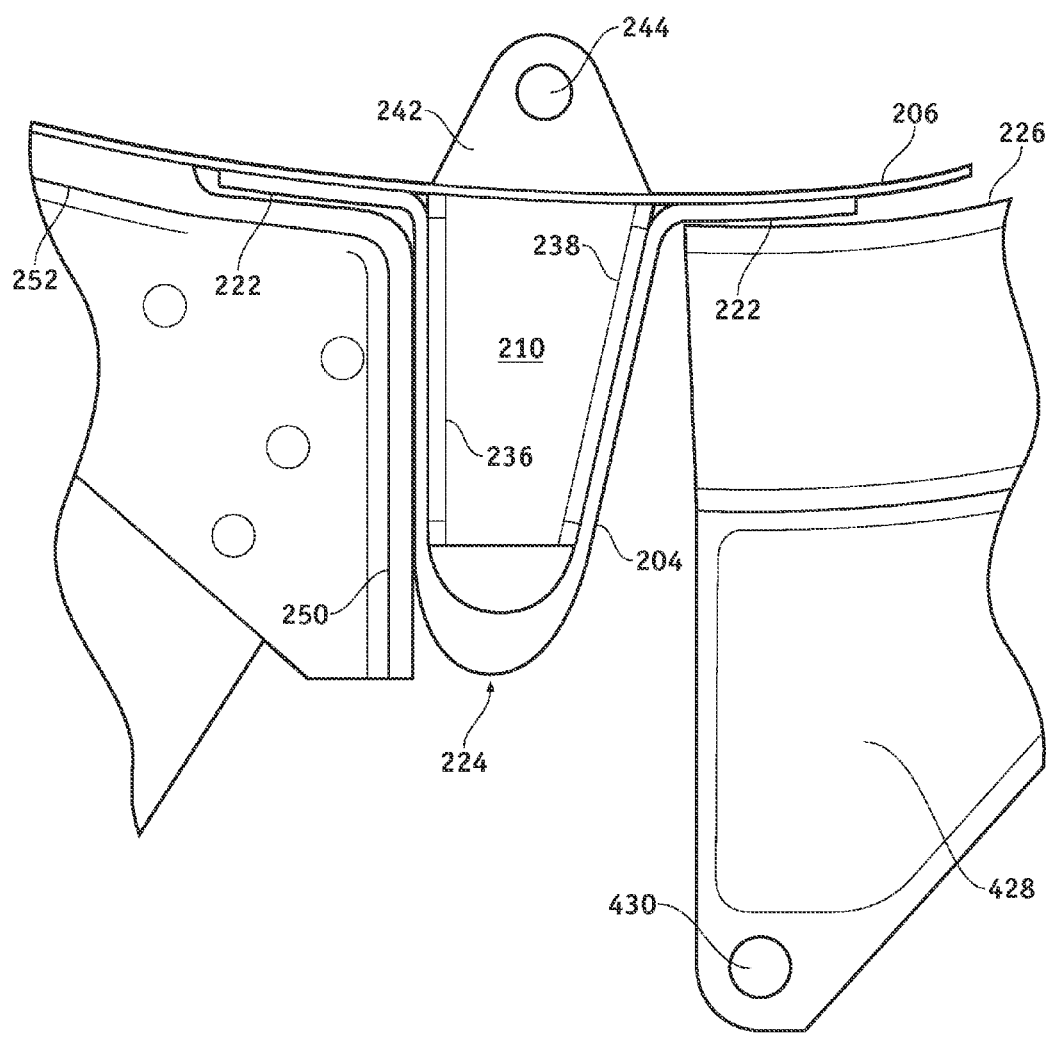
FIG. 8 is a detailed side view of a portion a lightweight aircraft passenger seat, showing the junction of a composite seat pan and a composite seat back structure.

Referring to FIGS. 6-8, an embodiment of aft cross beam 204 includes rear flange 222, which is configured for coupling to a seat back of the passenger seat. FIG. 6 is a side view of a portion of the aircraft passenger seat, showing the entire seat pan 200 and seat back structure 400, and FIG. 8 is a detailed side view of a portion of the passenger seat, showing the junction of seat pan 200 and seat back structure 400. In this example, rear flange 222 may be coupled to seat back structure 400 using fasteners, adhesive, welding, or some combination of the above. In practice, rear flange 222 is flexible and resilient to facilitate pivoting of seat back structure 400 relative to composite seat pan 200, thus forming a hinge which enables the seat back to recline for passenger comfort. Referring to FIG. 8, rear flange 222 has an upper surface that is coupled to the lower surface of skin 206, and rear flange 222 has a lower surface that is configured for coupling to an upper surface 226 of seat back structure 400. In this regard, aft cross beam 204 and seat back structure 400 may be coupled together to form an assembly of the aircraft passenger seat, where rear flange 222 serves as a hinge between skin 206 and seat back structure 400.

Skin 206 has an upper surface 228 and an opposite lower surface 230. Upper surface 228 represents the support surface of seat pan 200. As best depicted in FIG. 5, lower surface 230 is coupled to composite fore cross beam 202, to composite aft cross beam 204, and to spreader bars 208. In an embodiment of seat pan 200, skin 206 is configured as a structural element that resists fore-aft bending of fore cross beam 202 and aft cross beam 204. In other words, skin 206 functions to increase the strength of seat pan 200 for purposes of the fore-aft load path. As mentioned above, the structural characteristic of skin 206 allows fore cross beam 202 and aft cross beam 204 to be lightened because the cross beams and spreader bars need not provide all the fore-aft strength and rigidity for seat pan 200. As a simple analogy, skin 206, fore cross beam 202, and aft cross beam 204 are akin to a structural I-beam relative to the fore-aft direction.

Referring to FIG. 2 and FIG. 3, skin 206 may include reinforcing strips (or any suitably shaped elements) that provide enhanced rigidity and strength in attachment areas of skin 206. These attachment areas may correspond to cross-beam-to-skin junctions and/or to spreader-bar-to-skin junctions for seat pan 200. In this regard, skin 206 may include fore-aft reinforcing strips 232 and longitudinal reinforcing strips 234 coupled thereto or formed therein. In this embodiment, fore-aft reinforcing strips 232 are located over the upper mounting surfaces of spreader bars 208, and longitudinal reinforcing strips 234 are located over the flanges of fore cross beam 202 and aft cross beam 204. Reinforcing strips 232/234 are suitably configured to increase the strength, toughness, and shear resistance of skin 206 in the designated attachment areas, which may be penetrated by rivets, screws, bolts, or other fasteners during assembly of seat pan 200.

In certain embodiments, each longitudinal reinforcing strip 234 has a non-uniform cross section, relative to its major longitudinal axis. In other words, the cross sectional configuration of each longitudinal reinforcing strip 234 changes along its length (similar to that described above in connection with the non-uniform cross section of fore cross beam 202). In this regard, FIG. 13 is a simplified side view of skin 206 in exaggerated scale. FIG. 10 may also represent a cross sectional view of a longitudinal reinforcing strip 234 cut through its major longitudinal axis. The non-uniform cross section of the longitudinal reinforcing strip 234 reinforces skin 206 at one or more mounting locations for the support legs 218 of the seat. For example, longitudinal reinforcing strip 234 may be suitably configured to provide additional stiffness and strength at and between support legs 218. In the illustrated embodiment, longitudinal reinforcing strip 234 is thicker at and between support legs 218 and is thinner outside this span. This non-uniform thickness is shown in an exaggerated manner in FIG. 13. The non-uniform nature of skin 206 results in weight savings due to precise optimization of strength characteristics accomplished by tailoring the pan thicknesses to the loads imparted locally along the pan.

Skin 206 may be formed as a composite, or formed from a lightweight metal such as aluminum or titanium, a high strength molded plastic, or any suitable material or combination of materials. In one embodiment, skin 206 is formed as a one-piece composite construction. For example, composite skin 206 can be primarily formed from a thermoplastic resin and at least one layer of aramid fiber material (e.g., KEVLAR material). For the reasons mentioned above, PEKK is one thermoplastic resin that is particularly suitable for composite skin 206, and PEI is another suitable thermoplastic resin. This particular composite construction is desirable to provide toughness for composite skin 206 (rather than stiffness and rigidity). Thus, composite skin 206 exhibits resiliency and rip-stop characteristics that allow it to withstand some puncturing without breaking. Of course, alternative composite constructions may be utilized for composite skin 206, possibly at the cost of additional weight. On the other hand, reinforcing areas of composite skin, such as fore-aft reinforcing strips 232 and longitudinal reinforcing strips 234, may be formed with at least one layer of carbon graphite fiber material. The carbon graphite fiber material adds stiffness and rigidity to composite skin 206 in these reinforcement areas. Of course, other composite materials, resins, and fibers may be used in an embodiment of composite skin 206.

In one embodiment, composite skin 206 is formed as a unitary contoured piece having a nominal thickness of about 0.010 inch to about 0.040 inch. This nominal thickness represents areas having no reinforcing strips 232/234. Fore-aft reinforcing strips 232, however, may be formed by adding one or more layers of carbon graphite fiber material, aramid fiber material, or any suitable reinforcing material (approximately one inch wide) in the attachment areas, resulting in an overall thickness of about 0.070 inch in the respective reinforcing areas. Likewise, longitudinal reinforcing strips 234 may be formed from one or more additional layers of carbon graphite fiber material, aramid fiber material, or any suitable reinforcing material (approximately one inch wide). As described above with reference to FIG. 13, a relatively high number of additional layers of fiber material may be used to form the thicker portion of longitudinal reinforcing strips 234, while a relatively low number of additional layers of fiber material may be used to form the thinner portion of longitudinal reinforcing strips 234. In one practical embodiment, composite skin 206 is formed by sandwiching the carbon graphite fiber reinforcing material between two layers of KEVLAR composite.

In an alternate embodiment, seat pan 200 utilizes a composite sandwich construction in lieu of a unitary skin 206. In this alternate embodiment, seat pan 200 utilizes two skins (which may be configured substantially as described herein for skin 206) with a suitable core material, such as honeycomb, located between the two skins.

Figure 9:
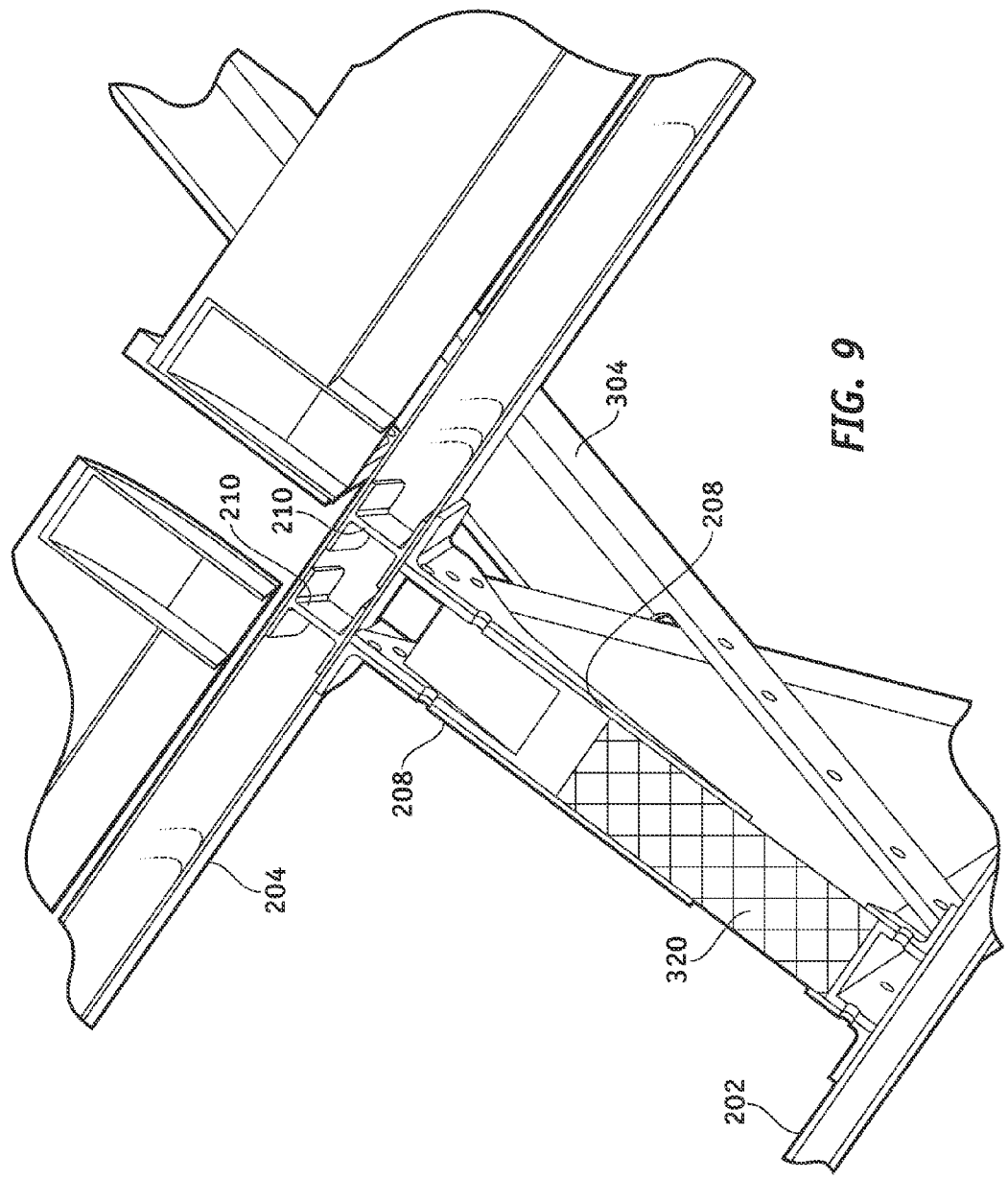
FIG. 9 is a perspective cross sectional view of the portion of the lightweight aircraft passenger seat as viewed along line A-A in FIG. 7.
Figure 14:
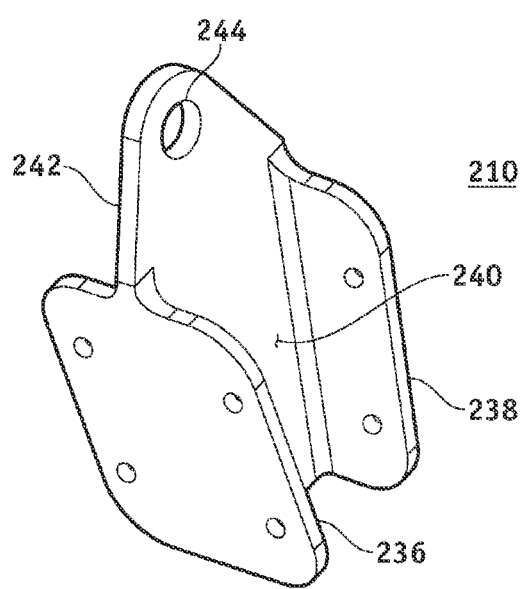
FIG. 14 is a perspective view of a seat belt anchor suitable for use in an embodiment of a lightweight aircraft passenger seat.

FIG. 14 is a perspective view of a seat belt anchor 210 suitable for use in an embodiment of a lightweight aircraft passenger seat. FIGS. 7-9 depict seat belt anchors 210 installed in composite aft cross beam 204. Seat belt anchors 210 may be formed from a composite material, a high strength molded plastic, a lightweight metal such as aluminum or titanium, or any suitable material or combination of materials. Referring to FIG. 14, seat belt anchor 210 generally includes a forward flange 236, a rear flange 238, and a web 240 between flanges 236/238. Seat belt anchor 210 may also have a protrusion 242 and a mounting hole 244 formed in protrusion 242. In this embodiment, protrusion 242 is formed as an extension of web 240. For this example, flanges 236/238 and web 240 are each approximately 0.08 inch thick.

As best illustrated in FIG. 8, seat belt anchor 210 is coupled within U-shaped section 224 of aft cross beam 204 such that forward flange 236 is flush against the forward "leg" of U-shaped section 224, and such that rear flange 238 is flush against the rear "leg" of U-shaped section 224. For this embodiment, rear flange 238 is angled relative to forward flange 236 (which is nominally oriented in a vertical position). In practice, seat belt anchors 210 are coupled to aft cross beam 204 by fastening forward flanges 236, U-shaped section 224, and spreader bars 208 together along the forward span of aft cross beam 204, and by fastening rear flanges 238 to U-shaped section 224 along the rear span of aft cross beam 204. FIG. 4 shows only a few seat belt anchors 210 installed in aft cross beam 204, and FIG. 3 shows all of the seat belt anchors 210 (only the protrusions 242 of seat belt anchors 210 are visible after composite skin 206 is in place).

Protrusions 242 and mounting holes 244 accommodate passenger seat belts (not shown) for the aircraft seat. For example, the seat belts can be attached to protrusions 242 using suitable fasteners inserted into mounting holes 244. Referring to FIG. 2, protrusions 242 and mounting holes 244 may also accommodate passenger armrest assemblies 246 for the aircraft seat. For example, a mounting feature of armrest assemblies 246 can be positioned between two protrusions 242 and secured using suitable fasteners inserted into mounting holes 244. For the illustrated embodiment, four armrest assemblies 246 are used for three passengers.

Referring to FIG. 3, one embodiment of composite seat pan 200 may employ eight identical seat belt anchors 210. An alternate embodiment of composite seat pan 200 may employ two end seat belt anchors (not separately shown) for the two ends of seat pan 200, and four identical seat belt anchors 210 for the middle of seat pan 200. Each of the two end seat belt anchors may resemble two of the single seat belt anchors 210 integrated into a one-piece component. Referring to FIG. 4, the use of different seat belt anchors at the ends of seat pan 200 may be desirable to accommodate the particular arrangement and location of spreader bars 208. The relationship between seat belt anchor position and spreader bar position is described in more detail below.

Figure 15:
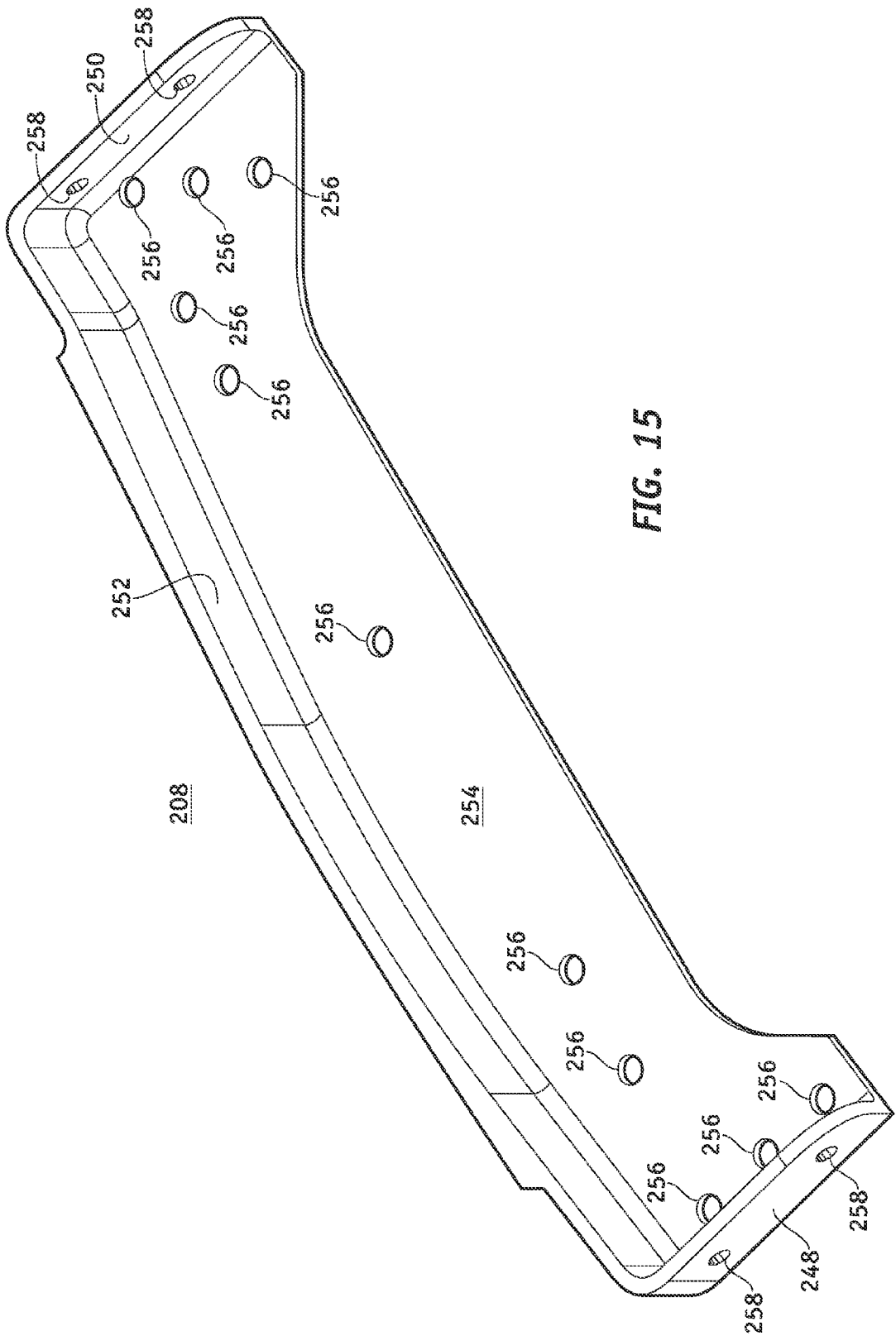
FIG. 15 is a perspective view of a spreader bar suitable for use in a lightweight aircraft passenger seat.

FIG. 15 is a perspective view of a spreader bar 208 suitable for use in composite seat pan 200. FIG. 4 and FIG. 5 depict spreader bars 208 coupled to composite fore cross beam 202 and to composite aft cross beam 204. Spreader bars 208 may be formed from a lightweight metal such as aluminum, a composite material, a high strength molded plastic, or any suitable material or combination of materials. In this embodiment, spreader bars 208 are formed from aluminum. Referring to FIG. 15, spreader bar 208 generally includes a fore flange 248, an aft flange 250, an upper flange 252, and a rib 254 between flanges 248/250. For this example, rib 254 is about 0.08 inch thick, and upper flange 252 varies from about 0.15 inch thick to about 0.25 inch thick. Spreader bar 208 may include a plurality of mounting holes 256 formed within rib 254 (mounting holes 256 are utilized to attach spreader bars 208 to the composite support legs as described below). Spreader bar 208 may also include mounting holes 258 formed within flanges 248/250, where mounting holes 258 are used to attach spreader bars 208 to composite cross beams 202/204 of seat pan 200.

As best illustrated in FIGS. 4, 5, and 7, spreader bars 208 function as structural support members for composite seat pan 200; spreader bars 208, fore cross beam 202, and aft cross beam 204 effectively form a support "frame" for composite skin 206. Referring to FIG. 7, fore flange 248 of spreader bar 208 is coupled to fore cross beam 202 (at its U-shaped section 216), aft flange 250 of spreader bar 208 is coupled to aft cross beam 204 (at its U-shaped section 224), and upper flange 252 of spreader bar 208 is coupled to the lower surface 230 of composite skin 206. In practice, fore flange 248 is configured for flush mounting with the rear "leg" of the U-shaped section 216 of fore cross beam 202, and aft flange 250 is configured for flush mounting with the forward "leg" of the U-shaped section 224 of aft cross beam 204. For this embodiment, flanges 248/250 of spreader bars 208 are nominally oriented in a vertical position. In practice, spreader bars 208 are coupled to fore cross beam 202, to aft cross beam 204, and to composite skin 206 using suitable fasteners and/or bonding techniques.

Referring to FIG. 4, one embodiment of composite seat pan 200 may employ eight spreader bars 208 in four mirror-image pairs. In such an embodiment, a mirror-image pair of spreader bars 208 may be coupled together (or located in close proximity to each other) for use as end spreader bars for the two ends of seat pan 200. Another embodiment of seat pan 200 utilizes two "double" spreader bars (not separately shown) for the ends of seat pan 200 and two mirror-image pairs of spreader bars 208 for the middle of seat pan 200. The mirror-image pairs also function as mounting brackets for the composite support legs, as described in more detail below. Referring to FIG. 4, the use of different spreader bars at the ends of seat pan 200 may be desirable to accommodate the lack of support legs at the ends of seat pan 200.

Spreader bars 208 are suitably configured to provide a variety of structural characteristics for composite seat pan 200. In this regard, spreader bars 208 hold fore cross beam 202 and aft cross beam 204 in a spaced-apart relationship, stabilize cross beams 202/204, and prevent movement and rotation of cross beams 202/204. Moreover, spreader bars 208 couple seat pan 200 to the composite support legs, thus establishing a load path from seat pan 200 to the support legs. In one embodiment, spreader bars 208 prevent buckling of composite skin 206, and composite skin 206 functions as a structural web between cross beams 202/204 and wrinkling may compromise its structural performance. Alternatively, composite skin 206 may be designed to buckle (within certain limits) to function as an intermediate diagonal tension web (i.e., a post-buckled web). Such a configuration enables seat pan 200 to carry loads under post-buckle conditions.

Spreader bars 208 are configured and arranged to provide an efficient and simple load path from seat belt anchors 210 to cross beams 202/204 and to composite skin 206. In this regard, FIG. 9 is a perspective cross sectional view of the portion of the lightweight aircraft passenger seat as viewed along line A-A in FIG. 7. Notably, spreader bars 208 are generally shaped as I-beams for purposes of fore-aft load transfer. In the illustrated embodiment, the webs 240 of seat belt anchors 210 are aligned (or approximately aligned) with the ribs 254 of spreader bars 208. This alignment is desirable to establish a direct (as close as practical) load path from seat belt anchors 210 to spreader bars 208 and, in turn, to the support legs. This simple and efficient load path enables the aircraft passenger seat to satisfy structural and impact specifications using a lightweight and compact construction.

An embodiment of a lightweight aircraft passenger seat can be manufactured with composite seat pan 200. In this regard, seat pan 200 can be manufactured as a subassembly that includes: fore cross beam 202; aft cross beam 204; composite skin 206; spreader bars 208; seat belt anchors 210; and fasteners. The manufacturing procedure may include the forming of fore cross beam 202 from a first composite extrusion using a continuous compression molding process as described above, and the forming of aft cross beam 204 from a second composite extrusion using the continuous compression molding process. As mentioned above, each cross beam 202/204 is preferably formed from multiple plies, where each ply comprises a thermoplastic resin (such as PEKK) and at least one layer of carbon graphite fiber material. For this embodiment, each cross beam 202/204 is formed from the preferred layup described above, and each cross beam 202/204 exhibits a non-uniform cross section along its major longitudinal axis for purposes of reinforcement in the desired locations.

The manufacturing process also includes the forming of composite skin 206. As mentioned above, composite skin 206 can be manufactured from thermoplastic resin (such as PEKK), at least one layer of aramid fiber material (such as KEVLAR material), and carbon graphite fiber material that serves as reinforcing material. Alternatively, composite skin 206 may be initially formed with a uniform thickness that is subsequently ground or machined to form thinner areas, while preserving thicker "reinforced" areas.

In accordance with one suitable manufacturing process, mounting holes for seat belt anchors 210 and spreader bars 208 are drilled into aft cross beam 204 and seat belt anchors 210 are inserted into aft cross beam 204. Next, spreader bars 208, aft cross beam 204, and seat belt anchors 210 are fastened together using rivets, bolts, or any suitable fastener (see FIG. 8 and FIG. 9). For the sake of clarity and simplicity, fasteners are not shown in the figures. Similarly, mounting holes for spreader bars 208 are drilled into fore cross beam 202 and, thereafter, spreader bars 208 and fore cross beam 202 are fastened together, resulting in a support frame for composite skin 206. In this manner, fore cross beam 202 is structurally joined to aft cross beam 204 with spreader bars 208.

Slots for the protrusions 242 of seat belt anchors 210 are formed within composite skin 206 before composite skin 206 is installed onto the support frame. The slots allow protrusions 242 to extend above composite skin 206 after seat pan 200 is assembled. Thus, once the slots have been formed, composite skin 206 can be structurally coupled to fore cross beam 202, aft cross beam 204, and spreader bars 208. In one embodiment, the lower surface 230 of composite skin 206 is bonded to the exposed upper surfaces of: forward flange 212 of fore cross beam 202; rear flange 214 of fore cross beam 202; forward flange 220 of aft cross beam 204; rear flange 222 of aft cross beam 204; and upper flanges 252 of spreader bars 208. Thereafter, the bonded joint locations can be drilled and secured together using rivets, bolts, or any suitable fasteners. For example, fastener holes may be drilled about every two inches along the length of cross beams 202/204 and along the length of spreader bars 208. As an alternative to adhesive bonding, thermoplastic welding utilizing resistive implants, lasers, or friction stirring are possible. The resulting seat pan 200 can then be readied for attachment of the composite support legs (described below).

Composite Support Legs

Figure 16:
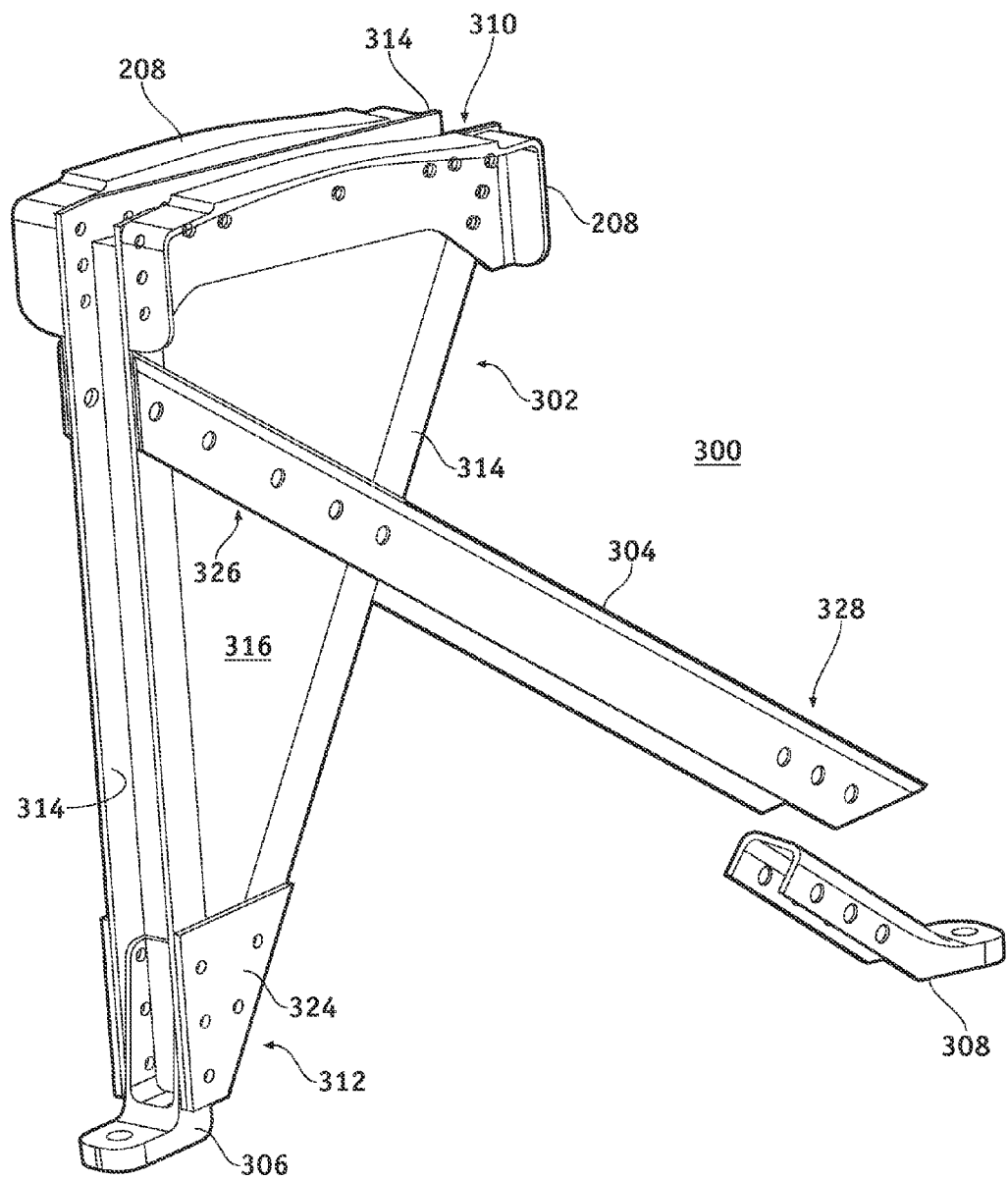
FIG. 16 is a perspective side view of an embodiment of a composite support leg of a lightweight aircraft passenger seat.
Figure 17:
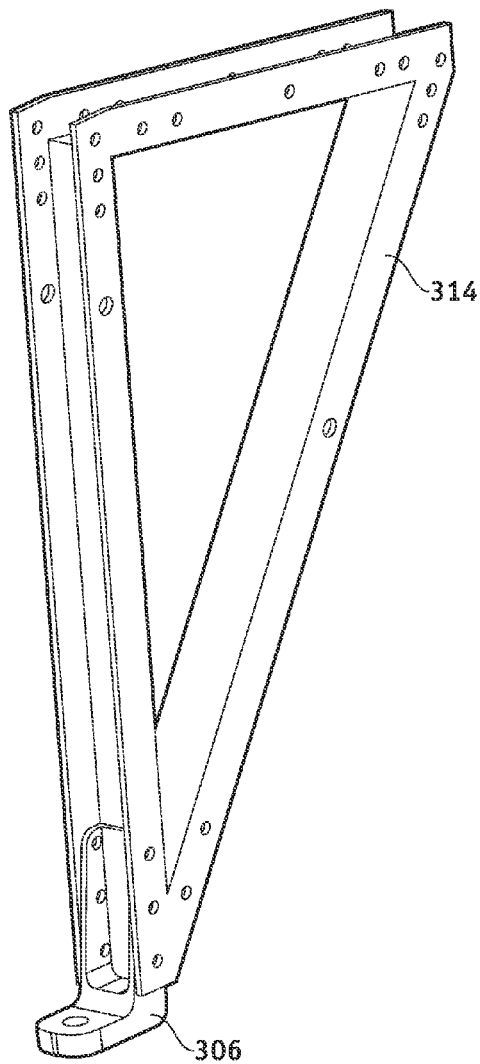
FIG. 17 is a perspective side view of extruded composite frame elements suitable for use in the composite support leg shown in FIG. 16.

In preferred embodiments, each composite support leg 300 employs a composite construction that is lightweight and producible in a cost-efficient manner. For example, each composite support leg 300 can be manufactured with a resulting weight of less than 1.5 pounds. Referring to FIGS. 16-25, each composite support leg 300 generally includes a structural box 302, a brace 304, a front fitting 306, and a rear fitting 308. FIG. 16 is a perspective side view of an embodiment of support leg 300 (where rear fitting 308 remains unassembled). FIG. 16 also shows spreader bars 208 to demonstrate how support leg 300 is coupled to seat pan 200.

Structural box 302 represents the main structural component of composite support leg 300. This embodiment of structural box 302 is generally triangular in shape, having an upper seat end 310 and a lower foot end 312 opposite seat end 310. Seat end 310 represents the end that will be coupled to seat pan 200, while foot end 312 represents the end that will be coupled to the floor of the aircraft. For this example, structural box 302 includes: a generally triangular outer frame 314; a first skin 316 coupled to one side of outer frame 314; a second skin 318 coupled to the other side of outer frame 314; and core material 320 coupled to and surrounded by outer frame 314. Core material 320 is also located between skins 316/318 and, in certain embodiments, core material 320 is coupled to skins 316/318.

Outer frame 314 may include a plurality of extruded composite frame elements (three in this embodiment) that combine to form the generally triangular shape. In practice, the three composite frame elements need not be coupled together to form an integral outer frame 314 (as depicted in FIG. 16). Rather, the individual frame elements can be coupled together when structural box 302 is assembled. In alternate embodiments, outer frame 314 may employ frame elements formed from a lightweight metal such as aluminum or titanium, a high strength molded plastic, a non-extruded composite, or any suitable material or combination of materials.

In one embodiment of composite support leg 300, each of the frame elements is a continuous compression molded composite element that is formed using an appropriate continuous compression molding process, as described above in the context of composite seat pan 200 (alternatively, outer frame 314 can be manufactured using traditional composite layering techniques). Indeed, the frame elements may be cut from a single extrusion that includes a thermoplastic resin (e.g., PEKK) and at least one layer of carbon graphite fiber material that has been formed using the continuous compression molding process. Of course, other composite materials, resins, and fibers may be used in an embodiment of outer frame 314. An embodiment of outer frame 314 may utilize extruded composite frame elements having the layup configuration described above in the context of fore cross beam 202. In one specific embodiment, approximately eighty percent of the fibers in the composite extrusion are oriented at approximately ±5 degrees relative to the major longitudinal axis of the extrusion, and approximately twenty percent of the fibers in the composite extrusion are oriented at approximately ±65 degrees relative to the major longitudinal axis of the extrusion.

In the illustrated embodiment, outer frame 314 is formed from a composite extrusion having a generally C-shaped cross section. Alternatively, outer frame 314 may be formed from a composite extrusion having any suitable and producible cross sectional shape, including, without limitation: L-shaped; U-shaped; Z-shaped; I-shaped; T-shaped; W-shaped; Π-shaped; V-shaped; Ω-shaped; or a closed shape such as a square or rectangular tube. The C-shaped cross section and the extruded composite construction of outer frame 314 results in a very strong, rigid, and stiff perimeter for structural box 302; the extruded frame elements serve as the primary stress members for composite support leg 300. For this example, the thickness of the frame elements (i.e., the height of the C) is about 1.25 inches, and the height of the frame element flanges is about 0.75 inches. Moreover, the extruded frame elements are approximately 0.10 inch thick (which represents about 20 molded plies).

Figure 18:
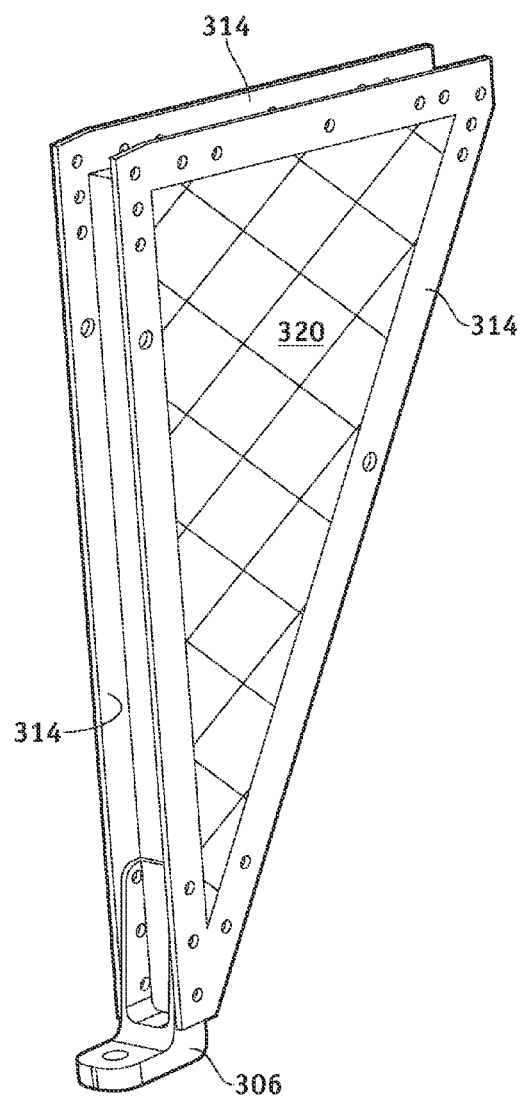
FIG. 18 is a perspective side view of extruded composite frame elements and core material suitable for use in the composite support leg shown in FIG. 16.
Figure 20:
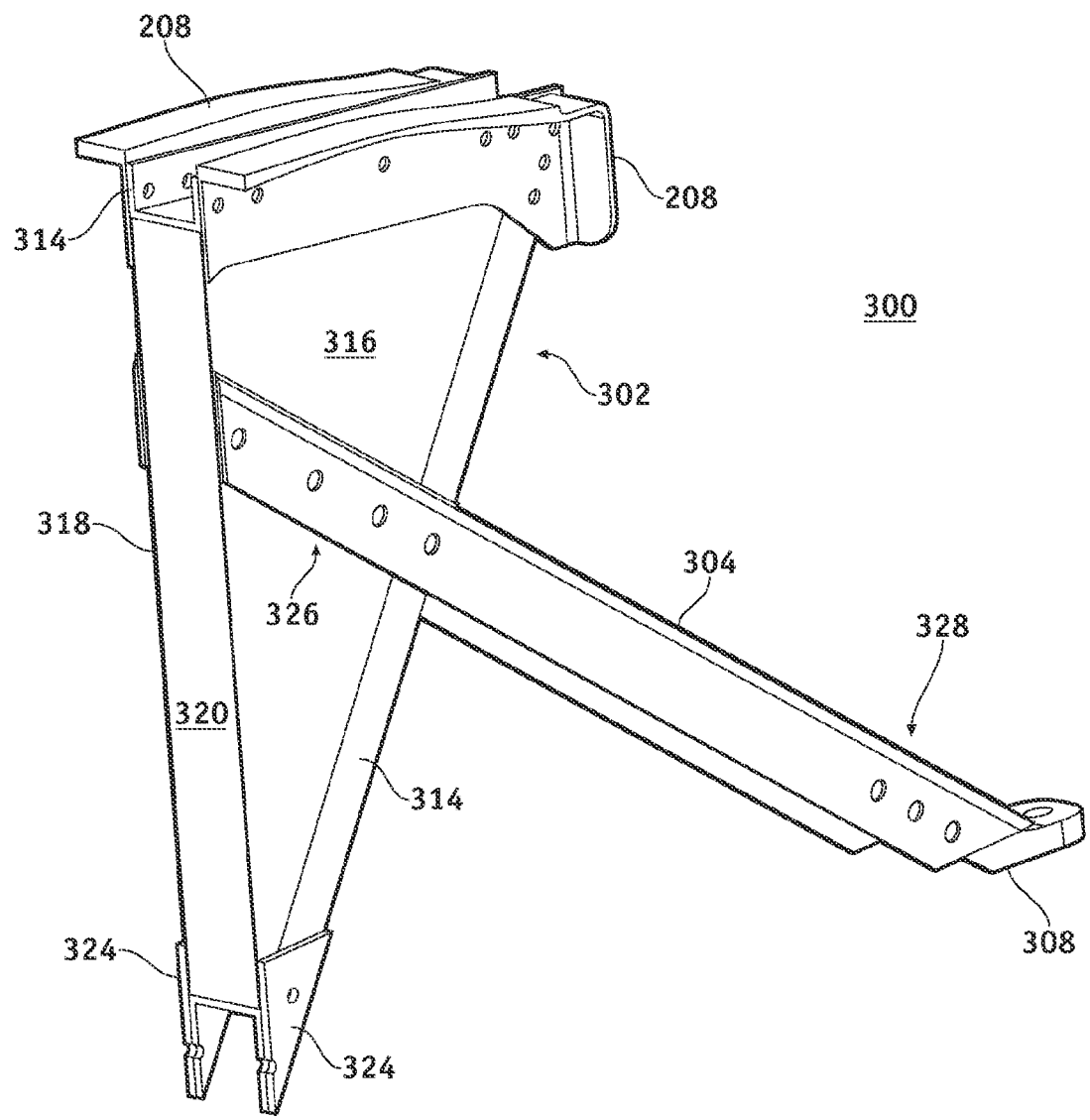
FIG. 20 is a perspective cross sectional view of the composite support leg shown in FIG. 16 cut through the core material.

Referring to FIG. 18 and FIG. 20, core material 320 is located inside of outer frame 314, and core material 320 functions to stabilize outer frame 314 (and to stabilize composite skins 316/318 of structural box 302). Core material 320 is a lightweight filler material or composition that provides additional structural integrity to outer frame 314. In this example, core material 320 is formed from a suitable honeycomb material, such as HEXWEB honeycomb material (available from Hexcel Corporation), NOMEX material (available from DuPont), or the like. Alternatively, core material 320 may include or be formed from a metal honeycomb, plastic foam, graphite foam, or the like. In the example embodiment, the honeycomb core material 320 may have cells that are generally orthogonal relative to composite skins 316/318. The honeycomb core material 320 is preferably sandwiched between, and coupled to, composite skins 316/318. The honeycomb core material 320 may also be coupled to the inside surface of outer frame 314. In practice, the honeycomb core material 320 may be attached to composite skins 316/318 and to outer frame 314 using a suitable glue, adhesive, epoxy, or the like. Additionally or alternatively, this sandwich construction may be coupled together using fasteners or any suitable attachment mechanism or architecture.

Skins 316/318 are of similar construction and, in the illustrated embodiment, are "mirror images" of each other. First skin 316 is coupled to the extruded composite frame elements on one side of outer frame 314, and second skin 318 is coupled to the extruded composite frame elements on the opposite side of outer frame 314. When structural box 302 is assembled, first skin 316 corresponds to the first major side of structural box 302, and second skin 318 corresponds to the second major side of structural box 302. Skins 316/318 function to hold the elements of structural box 302 together, while core material 320 serves to stabilize and prevent buckling of skins 316/318. In addition, skins 316/318 function as structural elements that transfer loads from brace 304 and propagate the loads to spreader bars 208 and to skin 206 of seat pan 200.

Figure 19:
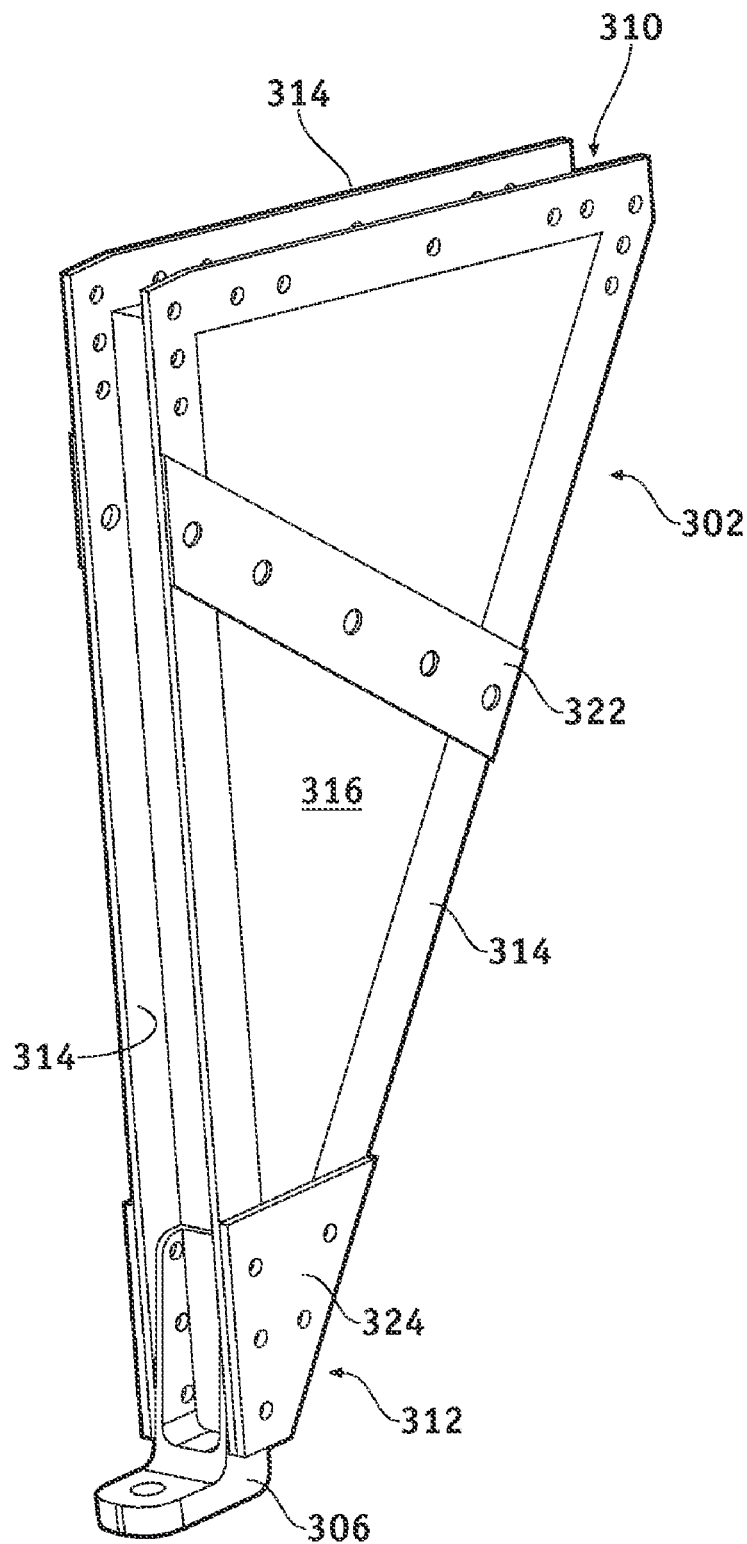
FIG. 19 is a perspective side view of an embodiment of a composite support leg, showing features of a composite side skin.
Figure 21:
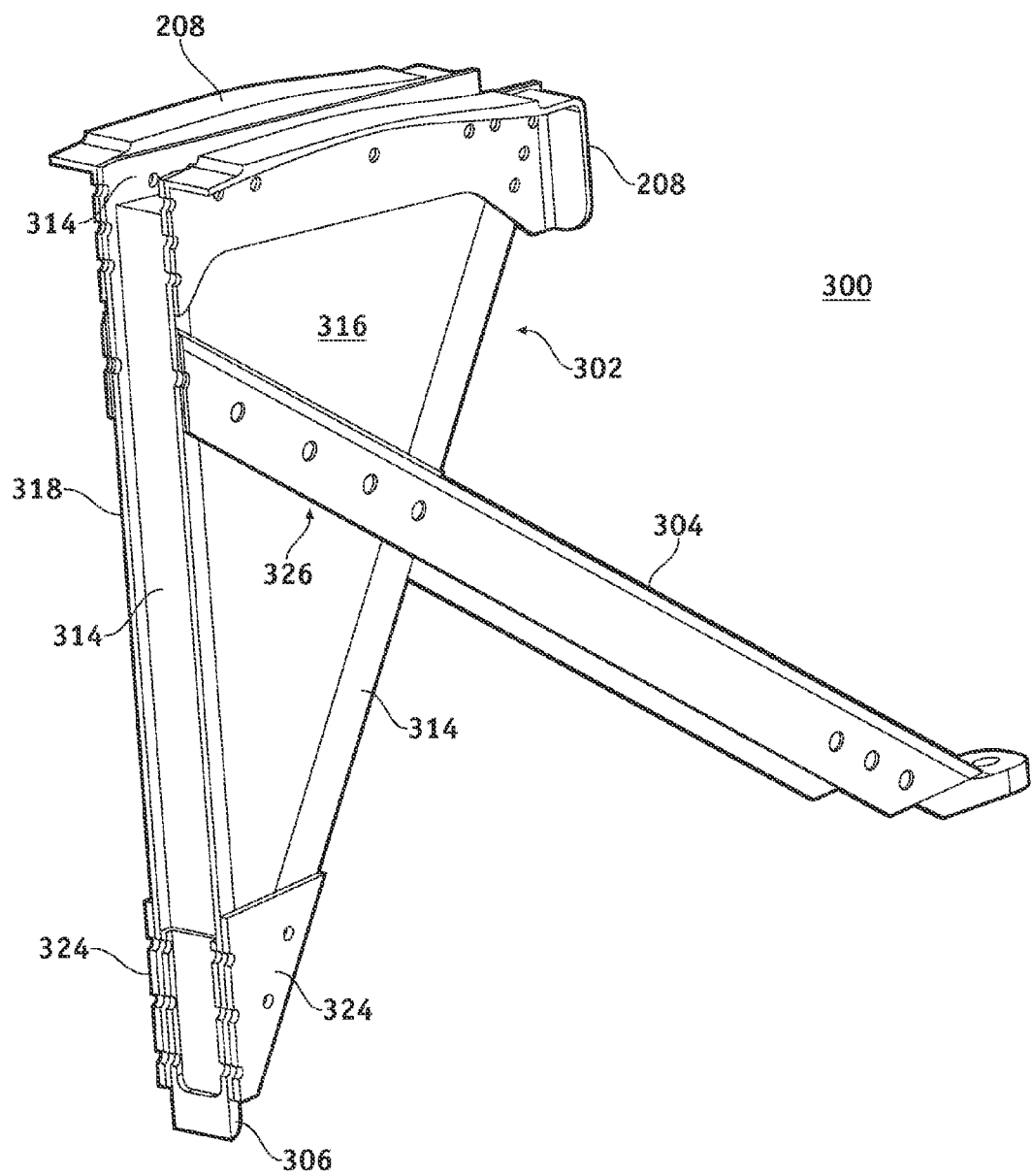
FIG. 21 is a perspective cross sectional view of the composite support leg shown in FIG. 16 cut through the flanges of the fore frame element.

Skins 316/318 may be formed from a composite material, a lightweight metal such as aluminum or titanium, a high strength molded plastic, or any suitable material or combination of materials. In one embodiment of composite support leg 300, each of the skins 316/318 is a composite construction that is formed from a thermoplastic resin (e.g., PEKK) and at least one layer of carbon graphite fiber material. Of course, other composite materials, resins, and fibers may be used in embodiments of composite skins 316/318. For the illustrated example, each composite skin 316/318 may have a nominal thickness of about 0.030 inch. Referring to FIG. 19, each composite skin 316/318 may also include reinforcing pad-up areas corresponding to mounting locations for components of composite support leg 300. For example, composite skin 316 includes a reinforcing pad-up area 322 corresponding to composite brace 304, and a reinforcing pad-up area 324 corresponding to front fitting 306. FIG. 21 illustrates how these reinforcing pad-up areas provide additional structural support for composite brace 304 and front fitting 306. These reinforcing pad-up areas can be formed during manufacturing of composite skins 316/318 by adding additional material (e.g., one or more pieces or layers of carbon graphite fiber material) where desired. In one embodiment, composite skins 316/318 are approximately 0.1 inch thick in these reinforcing pad-up areas.

An alternate embodiment of composite support leg 300 employs outer frame 314 without any core material 320 (and possibly without skins 316/318). Such an embodiment may utilize a stronger configuration for outer frame 314, for example, thicker composite extrusions, which enables outer frame 314 to serve as a structural truss.

Brace 304 may be formed from a composite construction, a lightweight metal such as aluminum or titanium, a high strength molded plastic, or any suitable material or combination of materials. In preferred embodiments, brace 304 is of a composite construction. Composite brace 304 is best depicted in FIG. 16 and FIG. 22 (which is a top view of composite brace 304). Composite brace 304 has a first end 326 that is coupled to structural box 302, and a second end 328 that extends away from seat end 310 of structural box 302; second end 328 also extends away from foot end 312 of structural box. Second end 328 is suitably configured for attachment to an aircraft mounting feature. In this embodiment, second end 328 is coupled to rear fitting 308.

FIG. 16 shows mounting holes for an embodiment of composite brace 304 and FIG. 22 depicts the mounting holes in dashed lines. The two outer mounting hole locations allow first end 326 of composite brace 304 to be coupled to outer frame 314 and composite skins 316/318 of structural box 302. The three inner mounting hole locations allow first end 326 of composite brace 304 to be coupled to composite skins 316/318 and to core material 320. In this regard, composite brace 304 may include a first flange 330 and an opposing second flange 332 (see FIG. 22). Thus, when composite support leg 300 is assembled, first flange 330 is coupled to one side of structural box 302 and second flange 332 is coupled to the other side of structural box 302.

In this embodiment, composite brace 304 resembles a C-channel with a portion removed to accommodate structural box 302. FIG. 22 shows an opening 334 in composite brace 304 that receives structural box 302 (see FIG. 16). Alternatively, composite support leg 300 may utilize a composite brace 336 having an Ω-shaped cross section (see FIG. 23 and FIG. 24). Composite brace 336 is similar to composite brace 304, however, composite brace 336 includes stiffening flanges 338 that correspond to the horizontal segments of the Ω shape. Stiffening flanges 338 provide additional structural support to composite brace 336, especially at flanges 340/342.

In practice, composite braces 304/336 can be realized as extruded composite elements formed from a thermoplastic resin (e.g., PEKK) and at least one layer of carbon graphite fiber material, as described above in the context of composite cross beams 202/204 for seat pan 200. Indeed, the same continuous compression molding process described above can be utilized to manufacture the composite extrusions used for composite braces 304/336.

In operation, composite braces 304/336 serve as tension link members for composite support leg 300. Referring to FIG. 7 and FIG. 24, rear fitting 308 may be used to couple composite braces 304/336 to the floor of the aircraft. Rear fitting 308 may, for example, be formed from a lightweight metal such as titanium or aluminum. When coupled to the floor of the aircraft, composite braces 304/336 function to prevent forward movement of the seat. In one embodiment, composite braces 304/336 are suitably configured to withstand at least 6500 pounds of weight in tension.

Front fitting 306 is coupled to foot end 312 of structural box 302, as depicted in FIGS. 16-19. Here, front fitting 306 is coupled to outer frame 314 proximate foot end 312 using rivets, bolts, or any suitable fasteners. This embodiment of front fitting 306 is configured for rigid attachment to an aircraft mounting feature, such as seat tracks, seat rails, or the like. Front fitting 306 may, for example, be formed from a lightweight metal such as aluminum or titanium.

FIG. 24 and FIG. 25 illustrate a shock-absorbing front fitting 344 that may be employed in lieu of rigid front fitting 306 (a similar shock-absorbing fitting may also be used in lieu of a rigid rear fitting 308). Front fitting 344 may be formed from a lightweight metal such as titanium or aluminum, a high strength molded plastic, a composite construction, or any suitable material or combination of materials. For this embodiment, front fitting 344 is formed from a metal. As shown in FIG. 24, shock-absorbing front fitting 344 is coupled to foot end 312 of structural box 302 (more specifically, front fitting 344 is coupled to outer frame 314). The base of front fitting 344 is configured for attachment to an aircraft mounting feature, e.g., seat tracks or a seat rail. Front fitting 344 is suitably configured to absorb energy and to facilitate limited travel of structural box 302 toward the aircraft mounting feature under high loading conditions. The arrow 346 in FIG. 24 represents this limited amount of travel. For this example, front fitting 344 is designed to allow about 1.2 inches of travel under high loading conditions. This shock-absorbing characteristic emulates flexing or bending of traditional metal-based aircraft passenger seats.

Referring to FIG. 25, an embodiment of shock-absorbing front fitting 344 may include a generally C-shaped channel section 348 having two opposing mounting flanges 350. Mounting flanges 350 are configured to allow coupling of front fitting 344 to structural box 302 (see FIG. 24). Front fitting 344 may also have a foot 352 that is suitably configured to allow coupling of front fitting 344 to a feature on the aircraft floor. Notably, mounting flanges 350 are angled relative to the floor mounting surface because this angle roughly corresponds to the direction of typical load paths contemplated by front fitting 344. This embodiment of front fitting 344 includes three slots 354 formed within, but only partially through, each mounting flange 350. Slots 354 may be formed by milling some of the material away from mounting flanges 350. The length of slots 354 determines the amount of allowable travel of structural box 302, and the width of slots 354 is dictated by the size of the mounting hardware.

Each slot 354 has a fastener hole 356 formed therein, where each fastener hole 356 is configured to receive a fastener for coupling shock-absorbing front fitting 344 to foot end 312 of structural box 302. For this example, fastener holes 356 are formed at or near the top of slots 354, as shown in FIG. 25. FIG. 24 shows the normal installation and operating configuration of composite support leg 300 with front fitting 344 coupled to structural box 302. Under normal operating conditions, structural box 302 is maintained in the position shown in FIG. 24 because fastener holes 356 and mounting flanges 350 remain intact to prevent travel of structural box 302 relative to foot 352 of front fitting 344. However, high loading conditions on seat end 310 of structural box 302 cause the fasteners in fastener holes 356 to shear through mounting flanges 350 in the area defined by slots 354. In other words, the intentionally weakened web within slots 354 deforms to allow structural box 302 to move in a downward direction toward foot 352. This deformation absorbs an appreciable amount of energy and shock that would otherwise need to be absorbed elsewhere by other means. Notably, the material used for front fitting 344, the shape and size of slots 354, the gauge of mounting flanges 350, and/or the amount of material removed to create slots 354 can be tuned to achieve the desired load bearing and deflection characteristics for front fitting 344.

Referring to FIGS. 16, 20, and 21, structural box 302 can be coupled to spreader bars 208 during assembly of the lightweight aircraft passenger seat. As best shown in FIG. 20, the flanges of outer frame 314 cooperate with ribs 254 of spreader bars 208, which are preferably aligned with webs 240 of seat belt anchors 210 (as described above in connection with seat pan 200). As mentioned above, this configuration establishes an efficient, simple, and effective load path from seat belt anchors 210 to seat pan 200 and to support legs 300.

An embodiment of a lightweight aircraft passenger seat can be manufactured with composite support legs 300. In this regard, each support leg 300 can be manufactured as a subassembly in the following manner. The manufacturing procedure may include the forming of a composite extrusion having a suitable composition, using a continuous compression molding process as described above. Then, extruded composite frame elements can be obtained from the composite extrusion (these frame elements will be used to create outer frame 314). In addition, the two composite skins are formed in the configurations described above using thermoplastic resin and carbon graphite fiber material.

The structural box 302 can be produced in the following manner. Indexing/alignment holes in the composite frame elements enable the composite frame elements to be held in a desired position using a suitable holding jig. Then, the composite frame elements are coupled together by bonding core material 320 to the inside surfaces of the composite frame elements. The core material 320 can be attached to the composite frame elements using a suitable foaming adhesive. In addition, composite skins 316/318 are affixed to outer frame 314 and to core material 320, thus sandwiching the extruded composite frame elements and core material 320 between composite skins 316/318. Composite skins 316/318 may be bonded to outer frame 314 and core material 320 using an appropriate adhesive. Thereafter, this subassembly may be subjected to pressure (using a press and/or a vacuum) and heat for curing, resulting in composite structural box 302.

Composite brace 304/336 is preferably formed as another composite extrusion (e.g., one having a composition of PEKK and carbon graphite fiber layers); the same continuous compression molding process can be utilized to form this extrusion. The extruded stock is then cut to form the opening 334 and the opposing flanges. The mounting holes in the flanges of composite brace 304/336 (the dashed lines in FIG. 22 and FIG. 23 represent these holes) and the corresponding mounting holes through structural box 302 (see FIG. 19) may be pre-drilled. Alternatively, composite brace 304/336 may be positioned and held onto structural box 302 such that the mounting holes can be drilled through the entire subassembly in one step.

Composite brace 304/336 is then coupled to structural box 302 using suitably configured fasteners. For example, shoulder bolts may be inserted into the mounting holes and tightened to secure the flanges of composite brace 304/336 to structural box 302. Shoulder bolts are desirable to prevent excessive compression of structural box 302, which might damage core material 320 and/or outer frame 314. Alternatively, metal sleeves could be fitted through the structural box 302, allowing the use of standard fasteners.

Rear fitting 308 may be formed from a lightweight metal such as aluminum or titanium, a high strength molded plastic, a composite, or any suitable material or combination of materials. Rear fitting 308 is preferably formed from a cast or milled lightweight and strong metal, e.g., titanium. As shown in FIG. 16 and FIG. 20, rear fitting 308 may be shaped to fit within the channel formed by composite brace 304/336. Rear fitting 308 is coupled to the end of composite brace 304/336 using suitable fasteners, such as rivets or bolts. Composite support leg 300 may employ a rigid front fitting (e.g., front fitting 306) or a shock-absorbing front fitting (e.g., front fitting 344). Front fitting 306 is preferably formed from a cast or milled lightweight and strong metal such as titanium. As shown in FIG. 16 and FIG. 21, front fitting 306 may be shaped to fit within the channel formed by outer frame 314 (near foot end 312 of structural box 302). Pad-up area 324 provides reinforcement for the mounting of front fitting 306. Front fitting 306 is coupled to structural box 302 using suitable fasteners, such as rivets, bolts, or shoulder bolts. Referring to FIG. 24 and FIG. 25, shock-absorbing front fitting 344 may also be formed from a cast or milled lightweight and strong metal such as titanium. Moreover, front fitting 344 is manufactured to have the characteristics and configuration described above. Front fitting 344 may be shaped to fit within the channel formed by outer frame 314 (at the lower aft section of structural box, near foot end 312). Pad-up area 324 provides reinforcement for the mounting of front fitting 344. Front fitting 344 is coupled to structural box 302 using suitable fasteners, such as rivets, bolts, or shoulder bolts.

For one exemplary triple seat configuration, two composite support legs 300 can then be readied for attachment to composite seat pan 200. Referring to FIG. 15 and FIG. 19, structural box 302 is drilled to match the mounting hole pattern of spreader bars 208. For this embodiment, these mounting holes are drilled around the flange of outer frame 314. These mounting holes may be pre-drilled in structural box 302 and/or spreader bars 208. Alternatively, composite support leg 300 may be positioned and held in place relative to one or more spreader bars 208 (as shown in FIG. 4 and FIG. 5) such that the mounting holes can be drilled through support leg 300 and spreader bars 208 in one step. Regardless of the specific drilling procedure, support legs 300 are coupled to seat pan 200 via spreader bars 208. In practice, each support leg 300 is attached to one or more spreader bars 208 using suitable fasteners, such as rivets, bolts, or shoulder bolts. The resulting subassembly can then be readied for attachment of the composite seat back structure (described below) and/or other seat components.

Composite Seat Back Structure

Figure 26:
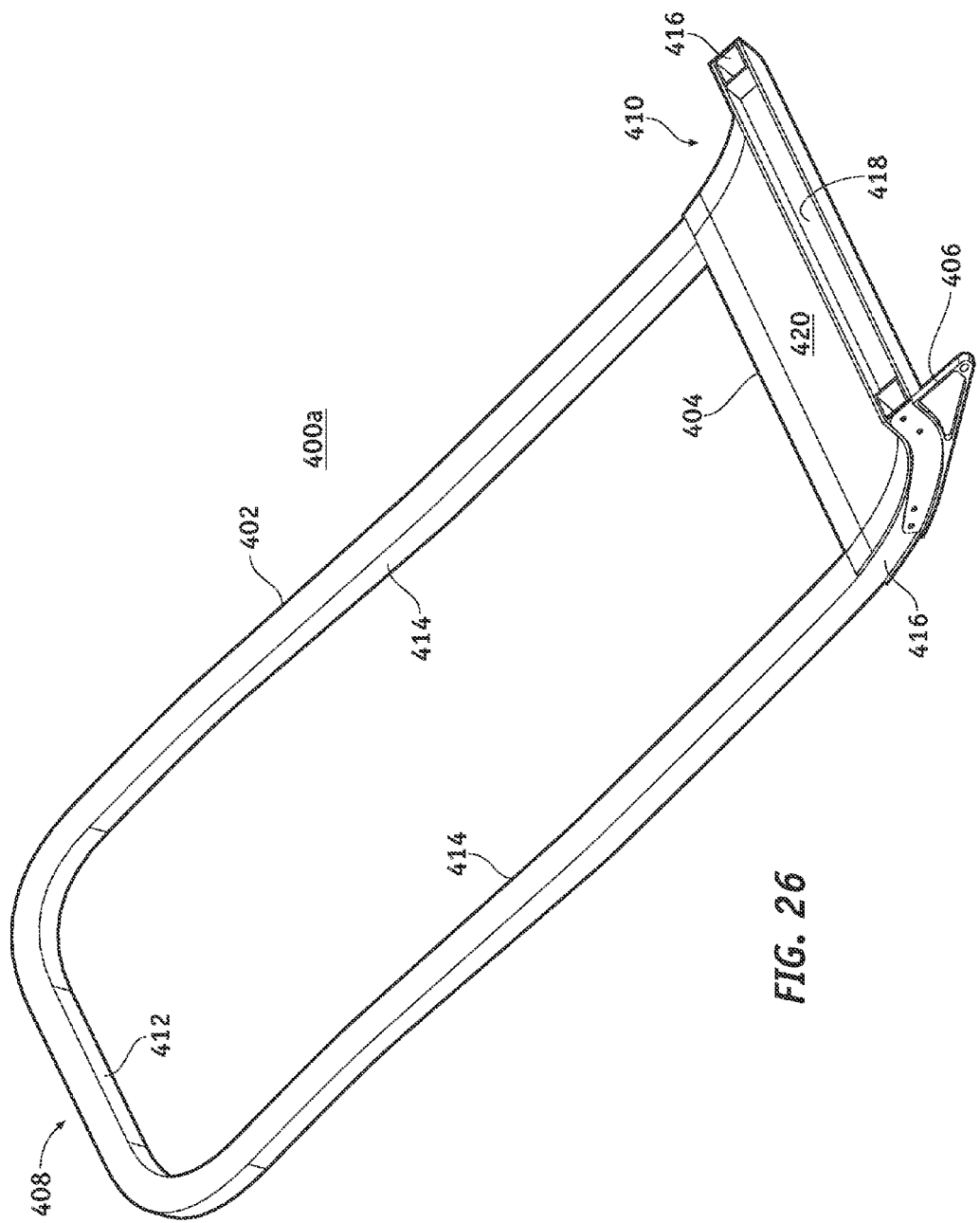
FIG. 26 is a perspective view of an embodiment of a composite seat back structure for a lightweight aircraft passenger seat.

Each composite seat back structure 400 employs a composite construction that is lightweight and producible in a cost-efficient manner. For example, each composite seat back structure 400 can be manufactured using molded composites, resulting in a weight of less than 3.0 pounds. FIG. 26 depicts one embodiment of a composite seat back structure 400a, and FIG. 30 depicts another embodiment of a composite seat back structure 400b.

Figure 28:
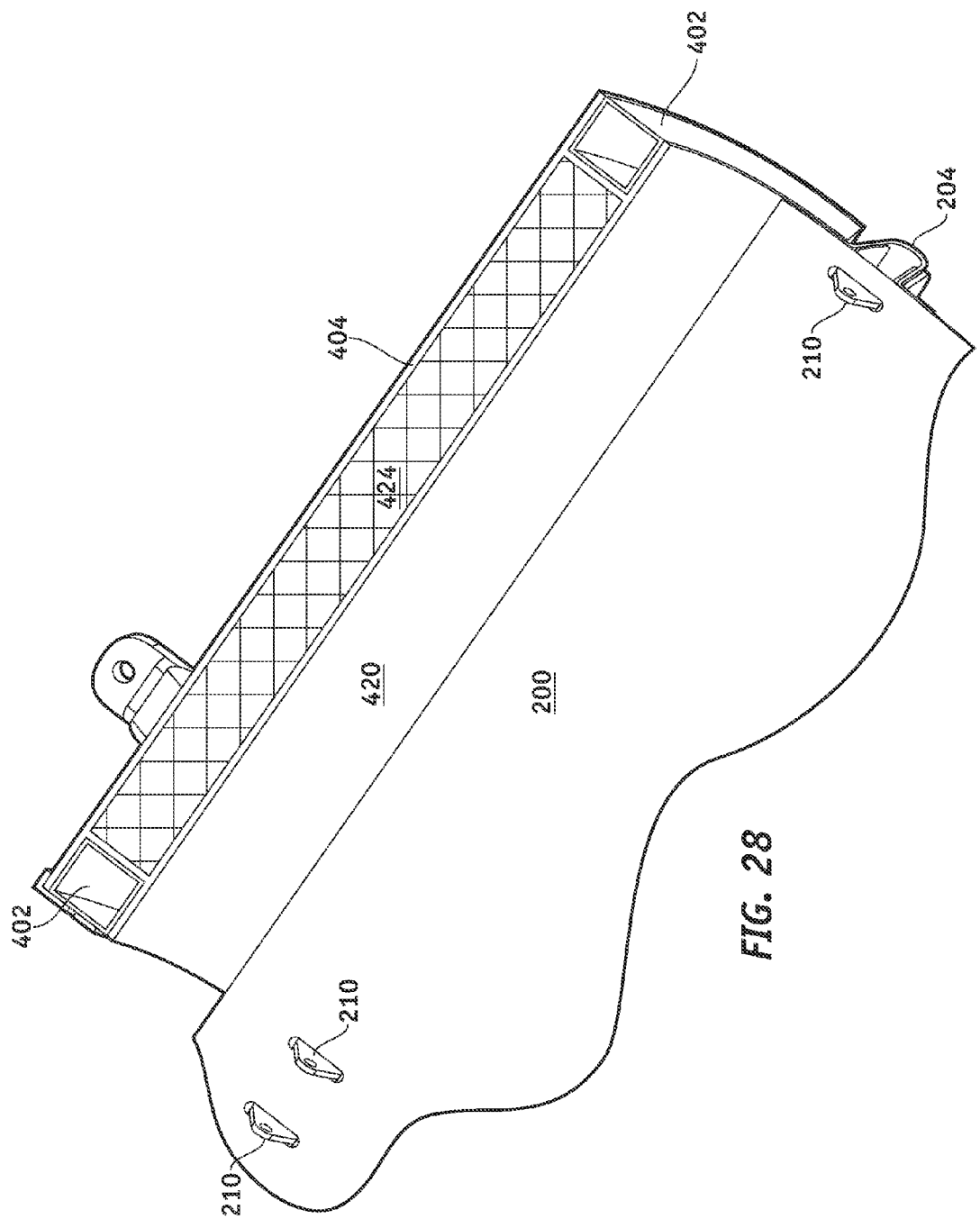
FIG. 28 is a perspective cross sectional view of the composite seat back structure shown in FIG. 26 cut through the major section of the torque box.

Referring to FIGS. 26-29, composite seat back structure 400a generally includes a support frame 402, a torque box 404 coupled to support frame 402, and an actuator rib 406 coupled to torque box 404. FIG. 26 is a perspective view of composite seat back structure 400a, FIG. 27 is a perspective view of an embodiment of torque box 404, FIG. 28 is a perspective cross sectional view of composite seat back structure 400a shown in FIG. 26 cut through the major section of torque box 404, and FIG. 29 is a perspective view of an embodiment of actuator rib 406.

Support frame 402 may be formed from a composite construction, a lightweight metal such as aluminum or titanium, a high strength molded plastic, or any suitable material or combination of materials. In this embodiment, support frame 402 may be realized as a one-piece component having an upper end 408 and a lower end 410. Upper end 408 corresponds to the upper back or headrest area of the passenger seat, while lower end 410 corresponds to the lumbar or hip area of the seat. Support frame 402 generally includes an arch segment 412 at upper end 408, opposing side segments 414 extending from arch segment 412, and curved legs 416 extending from side segments 414. Referring to FIG. 6, support frame 402 may have a gradually contoured profile that is designed for comfortable support of the passenger. When deployed, a textile diaphragm mesh or web element (not shown) may be installed on support frame 402 to form the seat back cushion and provide occupant back support.

In one embodiment, support frame 402 is a tube (for example, a square or rectangular tube) having a non-uniform gauge. For example, the gauge of the tube at curved legs 416 is preferably thicker than the gauge of the tube at arch segment 412 and at side segments 414. This additional thickness provides increased strength at curved legs 416, where higher torque is experienced. Moreover, the gauge of the tube at side segments 414 may be thicker than the gauge of the tube at arch segment 412. This variable gauge of support frame 402 may be desirable to reduce the weight of composite seat back structure 400a without compromising the structural integrity and performance of support frame 402. For example, the tube may have a nominal wall thickness of about 0.05 inch, where the wall thickness at arch segment is about 0.03 inch and the wall thickness at curved legs 416 is about 0.08 inch.

In certain embodiments, support frame 402 is formed as a composite construction using a suitable molding technique. In one embodiment, support frame 402 is formed from a thermoplastic resin (such as PEKK, for the reasons mentioned above) and at least one layer of carbon graphite fiber material. It should be appreciated that other composite materials, resins, and fibers may be used in an embodiment of support frame 402.

Torque box 404 may be formed from a composite construction, a lightweight metal such as aluminum or titanium, a high strength molded plastic, or any suitable material or combination of materials. Torque box 404 may be coupled to, or integrated into, lower end 410 of support frame 402. Torque box 404 is suitably configured to secure curved legs 416 relative to each other and to structurally reinforce support frame 402. In this regard, torque box 404 is configured to resist fore-aft bending of support frame (the bending mode that would otherwise be caused when the passenger leans back against the seat back). Moreover, torque box 404 is configured to transfer loads from composite seat back structure 400a to seat pan 200 via rear flange 222 of aft cross beam 204 as described above.

For this example, torque box 404 includes an outer frame 418, an upper skin 420, a lower skin 422, and core material 424 located within outer frame 418 and between upper skin 420 and lower skin 422. Core material 424 stabilizes upper skin 420 and lower skin 422 such that skins 420/422 do not buckle or deform. Outer frame 418 may be produced from extruded composite elements formed from a thermoplastic resin (e.g., PEKK) and at least one layer of carbon graphite fiber material, as described above in the context of composite cross beams 202/204 for seat pan 200. Moreover, upper skin 420 and lower skin 422 may each be produced from a thermoplastic resin (e.g., PEKK) and at least one layer of fiber material (e.g., aramid fiber material and/or carbon graphite fiber material). Core material 424 may utilize any suitable material, such as that described above for core material 320 of composite support leg 300.

As best shown in FIG. 27 and FIG. 28, the two side sections of outer frame 418 may serve as mounting channels for curved legs 416 of composite support frame 402. Curved legs 416 can be attached to outer frame 418 using a suitable bonding adhesive, welding techniques, and/or using fasteners such as rivets or bolts. Alternatively, it may be possible to form an integrated component that includes support frame 402 and torque box 404 (or sections thereof).

The illustrated embodiment also includes actuator rib 406 coupled to composite torque box 404. In practice, actuator rib 406 can be formed of a lightweight metal such as aluminum or titanium. Actuator rib 406 may be cast from such metal for ease of manufacturing. In one embodiment, actuator rib 406 can be attached to a curved leg 416 using a suitable bonding adhesive and/or using fasteners such as rivets or bolts.

Referring to FIG. 29, actuator rib 406 may have a mounting channel or shoulder 425 formed therein. Shoulder 425 is configured to generally follow the contour of composite torque box 404 at the location shown in FIG. 26. Actuator rib 406 is shaped and configured as a moment arm for an actuator 426 (see FIG. 7 and FIG. 24), where actuator 426 regulates the pivoting rate of composite seat back structure 400a relative to seat pan 200. In this regard, actuator rib 406 includes an extension 428 having a mounting hole 430 formed therein. As shown in FIG. 7, one end of actuator 426 is coupled to mounting hole 430. The other end of actuator 426 may be coupled to an appropriate feature or element of composite support leg 300 and/or to an appropriate feature or element of a spreader bar 208.

In this example, composite seat back structure 400a need not use more than one actuator rib 406. Rather, seat back structure 400a is suitably configured such that a single actuator rib 406 can serve as a lever for actuator 426. Each seat back utilizes only one actuator 426, and actuator rib 406 increases the moment arm to enable easier actuation of seat back structure 400a relative to seat pan 200. When released, actuator 426 allows seat back structure 400a to pivot relative to seat pan 200; when engaged, actuator 426 maintains the position of seat back structure 400a relative to seat pan 200. Thus, actuator 426 and actuator rib 406 provide structural support to prevent seat back structure 400a from inadvertently moving.

As described above in the context of seat pan 200, composite seat back structure 400a is preferably configured to be attached to composite aft cross beam 204 of seat pan 200 in a manner than allows seat back structure 400a to recline relative to aft cross beam 204. In particular, the lower surface of rear flange 222 of aft cross beam 204 may be coupled to composite torque box 404 such that rear flange 222 can serve as a flexible and resilient hinge for seat back structure 400a (see FIG. 8 and FIG. 28). In addition, the return spring contained in traditional actuators could be eliminated by taking advantage of the natural resiliency of the composite hinge. In other words, the hinge formed by joining the aft cross beam 204 to the composite torque box 404 acquires sufficient energy when deflected to return the seat back to its un-deflected position once released. Here, rear flange 222 can be attached to outer frame 418 of torque box 404 using a suitable bonding adhesive and/or using fasteners such as rivets or bolts. In this embodiment, rear flange 222 represents the only structural coupling point between seat back structure 400*a* and seat pan 200. Notably, this configuration eliminates the need for a distinct hinge assembly or any rotating machinery at the junction of seat back structure 400*a* and seat pan 200, resulting in a simpler design and less overall weight for the aircraft seat. Importantly, this configuration eliminates the procedures and costs normally associated with the maintenance of seat hinge assemblies, which traditionally represents one of the higher maintenance costs of aircraft seats.

For ease of production, composite seat back structure 400 may instead be configured such that a separate torque box need not be utilized. Such an embodiment of composite seat back structure 400*b* is shown in FIG. 30 and FIG. 31. Composite seat back structure 400*b* generally includes a first half-shell 432 and a second half-shell 434 that are coupled together into a single component. The dashed line in FIG. 30 represents a seam or joint between half-shells 432/434.

Each half-shell 432/434 may be formed from a composite construction, a lightweight metal such as aluminum or titanium, a high strength molded plastic, or any suitable material or combination of materials. For this example, each of the half-shells 432/434 is realized as a composite that is formed using a suitable molding technique. In one embodiment, each half-shell 432/434 is formed from a thermoplastic resin (such as PEKK, for the reasons mentioned above) and at least one layer of carbon graphite fiber material. It should be appreciated that other composite materials, resins, and fibers may be used in an embodiment of composite seat back structure 400*b*.

Notably, FIG. 30 may also generally represent the profile view of composite seat back structure 400*a* (see FIG. 26). In this regard, composite half-shell 432 corresponds to the forward-facing portion of composite seat back structure 400*b*, and composite half-shell 434 corresponds to the rear-facing portion of seat back structure 400*b*. In this embodiment, half-shell 432 includes a support frame segment 436 having an upper end and a lower end, and an integral skin element 438 located at the lower end of support frame segment 436. Likewise, half-shell 434 includes a support frame segment 440 having an upper end and a lower end, and an integral skin element 442 located at the lower end of support frame segment 440. The dashed lines in FIG. 29 represent skin elements 438/442.

Referring to FIG. 31, seat back structure 400*b* may also include core material 444 located between skin elements 438/442. As mentioned above, half-shells 432/434 may be coupled or formed together into a single component such that skin elements 438/442 and core material 444 form an integral torque box for seat back structure 400*b*. In contrast to that depicted in FIG. 28, core material 444 fully extends to the outer perimeter of the torque box, where the outer perimeter is defined by skin elements 438/442 and the two side walls of the lower end of half-shells 432/434. Core material 444 may be formed as a distinct piece that is subsequently bonded between composite half-shells 432/434 during assembly. Alternatively, core material 444 may be integrally formed into one or both half-shells 432/434 during the molding of half-shells 432/434.

After it is produced, composite seat back structure 400*b* may have the characteristics, features, and functionality described above in the context of composite seat back structure 400*a*. For the sake of brevity, such common aspects will not be redundantly described here in the context of seat back structure 400*b*.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method of manufacturing a composite seat pan for a lightweight aircraft passenger seat, the method comprising:
    forming a fore cross beam from a first composite extrusion using a continuous compression molding process;
    forming an aft cross beam from a second composite extrusion using the continuous compression molding process;
    structurally joining the fore cross beam to the aft cross beam with a plurality of spreader bars; and
    structurally coupling a composite skin to the fore cross beam, the aft cross beam, and the spreader bars;
    wherein forming the fore cross beam comprises forming, in a first layup, the first composite extrusion from material having directional fibers, where at least thirty percent of the fibers in the first composite extrusion are oriented within the range of ±30 degrees relative to the major longitudinal axis of the first composite extrusion; and
    wherein forming the aft cross beam comprises forming, in a second layup, the second composite extrusion from material having directional fibers, where at least thirty percent of the fibers in the second composite extrusion are oriented within the range of ±30 degrees relative to the major longitudinal axis of the second composite extrusion.

2. A method according to claim 1, further comprising forming the composite skin from a thermoplastic resin and at least one layer of aramid fiber material.

3. A method according to claim 2, wherein forming the composite skin comprises reinforcing the composite skin in attachment areas corresponding to cross-beam-to-skin junctions and spreader-bar-to-skin junctions.

4. A method according to claim 3, wherein reinforcing the composite skin comprises adding at least one layer of carbon graphite fiber material in the attachment areas.

5. A method according to claim 1, wherein:
    in the first layup, more than fifty percent of the fibers in the first composite extrusion are oriented at approximately ±5 degrees relative to the major longitudinal axis of the first composite extrusion, and less than fifty percent of the fibers in the first composite extrusion are oriented at approximately ±65 degrees relative to the major longitudinal axis of the first composite extrusion; and
    in the second layup, more than fifty percent of the fibers in the second composite extrusion are oriented at approximately ±5 degrees relative to the major longitudinal axis of the second composite extrusion, and less than fifty percent of the fibers in the second composite extrusion are oriented at approximately ±65 degrees relative to the major longitudinal axis of the second composite extrusion.

6. A method according to claim 5, wherein:
in the first layup, approximately eighty percent of the fibers in the first composite extrusion are oriented at approximately ±5 degrees relative to the major longitudinal axis of the first composite extrusion, and approximately twenty percent of the fibers in the first composite extrusion are oriented at approximately ±65 degrees relative to the major longitudinal axis of the first composite extrusion; and
in the second layup, approximately eighty percent of the fibers in the second composite extrusion are oriented at approximately ±5 degrees relative to the major longitudinal axis of the second composite extrusion, and approximately twenty percent of the fibers in the second composite extrusion are oriented at approximately ±65 degrees relative to the major longitudinal axis of the second composite extrusion.

* * * * *